(12) United States Patent
Yoshikawa

(10) Patent No.: US 6,871,343 B1
(45) Date of Patent: Mar. 22, 2005

(54) CENTRAL PROCESSING APPARATUS AND A COMPILE METHOD

(75) Inventor: Takashi Yoshikawa, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 769 days.

(21) Appl. No.: 09/667,776

(22) Filed: Sep. 22, 2000

(30) Foreign Application Priority Data

Sep. 22, 1999 (JP) .......................................... P11-267889

(51) Int. Cl.$^7$ ........................... G08F 9/45; G06F 15/00; G06F 9/46
(52) U.S. Cl. ........................ 717/161; 712/226; 718/102
(58) Field of Search .............................. 717/140–161; 712/23, 200, 205, 215, 217, 218, 226, 235; 709/102

(56) References Cited

U.S. PATENT DOCUMENTS

| | | | | | |
|---|---|---|---|---|---|
| 5,185,871 | A | * | 2/1993 | Frey et al. | 712/205 |
| 5,491,829 | A | * | 2/1996 | Kau et al. | 712/23 |
| 5,511,172 | A | * | 4/1996 | Kimura et al. | 712/235 |
| 5,778,245 | A | * | 7/1998 | Papworth et al. | 712/23 |
| 5,974,240 | A | * | 10/1999 | Chan | 712/218 |
| 5,974,526 | A | * | 10/1999 | Garg et al. | 712/23 |
| 6,035,122 | A | * | 3/2000 | Ando | 717/155 |
| 6,092,176 | A | * | 7/2000 | Iadonato et al. | 712/23 |
| 6,105,128 | A | * | 8/2000 | Hathaway et al. | 712/215 |
| 6,192,464 | B1 | * | 2/2001 | Mittal | 712/200 |
| 6,289,433 | B1 | * | 9/2001 | Garg et al. | 712/23 |
| 6,360,309 | B1 | * | 3/2002 | Iadonato et al. | 712/23 |

OTHER PUBLICATIONS

Sohi, Gurindar S. et al., "Multiscalar Processors", 22$^{nd}$ International Symposium on Computer Architecture (ISCA–22); (1995).

Palacharla, S. et al., "Complexity–Effective Superscalar Processors", 24$^{th}$ International Symposium on Computer Architecture (ISCA–24), pp. 1–13, (1997).

Mahlke, Scott A. et al., "A Comparison of Full and Partial Predicated Execution Support for ILP Processors", (ISCA–22), pp.1–12, Jun. 1995.

* cited by examiner

Primary Examiner—Kakali Chaki
Assistant Examiner—Trent Roche
(74) Attorney, Agent, or Firm—Finnegan, Henderson, Farabow, Garrett & Dunner, L.L.P.

(57) ABSTRACT

Systems and methods are disclosed for generating a program executed by a central processing apparatus for assigning instructions of the program. The systems and methods may include dividing the program into a plurality of instruction sequences, each instruction sequence comprising a plurality of instructions not executable in parallel because of data dependency. In addition, the systems and methods may include moving an instruction sequence speculatively executable forward an instruction sequence not speculatively executable in the program and aligning the plurality of instruction sequences in correspondence with each of the plurality of buffers. Moreover, the systems and methods may include assigning a task number representing the instruction sequence and a corresponding buffer to each instruction and replacing a condition instruction by a commit instruction, the commit instruction including a condition, task numbers to be accepted if the condition is not satisfied and task numbers to be rejected if the condition is satisfied.

24 Claims, 20 Drawing Sheets

```
        beq r 3, r4, L2
        li r5, 0
        j L 1
L2:     sll r6, r10, 2
        li r5, 1
L1:     move r2, r5
```

Fig. 1 (PRIOR ART)

```
(1)  pseq <p1, p2>, r3, r4
(2)  <p2> li r5, 0
(3)  <p1> sll r6, r10, 2
(4)  <p1> li r5, 1
(5)  move r2, r5
```

Fig. 2 (PRIOR ART)

| CLASS OF INSTRUCTION | OPERAND DATA | EXCEPTIONAL DATA |
|---|---|---|
|  |  |  |
| l w | 7, 3, 0 (0) |  | ← tail
| s l l | 3, 4, 0 (6) |  | ← execute
| a d d i u | 4, 5, 0 (100) |  | ← commit
| a d d u | 5, 6, 0 (0) |  | ← head
|  |  |  |

Fig. 6

| STORE ADDRESS | STORE VALUE | STORE WIDTH | TWID | CMT | CLR | |
|---|---|---|---|---|---|---|
|  |  |  |  |  |  |  |
| 10046e3c | 3d70 | H | 1 | 0 | 0 | ← tail |
| 10002a1e | 1f | B | 0 | 0 | 1 |  |
| 10015d60 | 1eb94 | W | 0 | 1 | 0 | ← head |
|  |  |  |  |  |  |  |

Fig. 9

| LOAD ADDRESS | REGISTER FIELD | valid | RFL | |
|---|---|---|---|---|
|  |  |  |  |  |
| 100143e0 | 02,08,15,22,10,34,01,05 | 00101001 | 0 | ← tail |
| 10003160 | 03,05,14,13,07,04,05,08 | 01000101 | 1 | ← head |
|  |  |  |  |  |
|  |  |  |  |  |

Fig. 10

| TASK NUMBER | LOAD ADDRESS | LOAD WIDTH | CNF | VLD |
|---|---|---|---|---|
| 3 | 1000923a | H | 0 | 1 |
| 4 | 1001024c | W | 1 | 0 |
| 2 | 1002149d | B | 1 | 1 |
|  |  |  |  |  |

```
        lbu.e       $ 3, Ch_1_Glob ($ 0)
        bne         $ 3, $ 6, $ L48
        lw.e        $ 5, Int_Glob ($ 0)
        addiu       $ 7, $ 7, - 1
        move        $ 2, $ 0
        subu        $ 3, $ 7, $ 5
        sw          $ 3, 0 ($ 4)

$ L48:
        addiu       $ 6, $ 0, 5
```

Fig. 13

```
1 : lbu.e       $ 3, Ch_1_Glob ($ 0)
2 : lw.e        $ 5, Int_Glob ($ 0)
2 : addiu       $ 7, $ 7, - 1
3 : move        $ 2, $ 0
2 : subu        $ 3, $ 7, $ 5
2 : sw          $ 3, 0 ($ 4)
1 : cmt.ne      $ 3, $ 6,
                |1, 2, 3|, |2, 3|
1 : addiu       $ 6, $ 0, 5
```

```
reflect:
    move    $114, $6:move $113, $5; move $112, $4
    slti    $115, $114, 2; nop:nop
    bne     $115, $0, $L109; nop:nop
    lw.e    $117, boardsize($0); nop:nop
    subu    $113, $117, $116; nop:nop $L109:
    addiu   $118, $0, 1; nop: nop
    beq     $114, $118, $L111; nop: nop
    addiu   $119, $0, 3; nop:nop
    bne     $114, $119, $L110; nop:nop $L111:
    lw.e    $121, boardsize($0); addiu $120, $112, 1; nop
    subu    $112, $121, $120; nop:nop $L110:
    lw.e    $123, boardsize($0); nop:nop
    mult    $113, $123; nop:nop
    nop; nop
    nop; nop
    mflo    $124; nop: nop
    jr      $31; addu$2, $124, $112; nop
```

Fig. 23

(BASIC BLOCK 1)
DATA DEPENDENCE SEQUENCE 1 ──┐ move   $1114, $6
                              │ slti   $1115, $1114, 2
DATA DEPENDENCE SEQUENCE 2 ──┤ bne    $1115, $0, $L1109
DATA DEPENDENCE SEQUENCE 3 ──┤ move   $1113, $5
                              │ move   $1112, $4

(BASIC BLOCK 2)
DATA DEPENDENCE SEQUENCE 4 ──┐ lw.e   $1117, boardsize ($0)
DATA DEPENDENCE SEQUENCE 5 ──┤ addiu  $1116, $1113, 1
                              │ subu   $1113, $1117, $L116

(BASIC BLOCK 3)
DATA DEPENDENCE SEQUENCE 6 ──┐ addiu  $1118, $0, 1
                              │ beq    $1114, $1118, $L1111

(BASIC BLOCK 4)
DATA DEPENDENCE SEQUENCE 7 ──┐ addiu  $1119, $0, 3
                              │ bne    $1114, $1119, $L1110

(BASIC BLOCK 5)
DATA DEPENDENCE SEQUENCE 8 ──┐ lw.e   $1121, boardsize ($0)
DATA DEPENDENCE SEQUENCE 9 ──┤ addiu  $1120, $1112, 1
                              │ subu   $1112, $1121, $1120

(BASIC BLOCK 6)
DATA DEPENDENCE SEQUENCE 10 ─┐ lw.e   $1123, boardsize ($0)
                              │ mult   $1113, $1123
                              │ nop
                              │ nop
                              │ mflo   $1124
                              │ addu   $2, $1124, $1112
DATA DEPENDENCE SEQUENCE 11 ─→ jr     $31

Fig. 24

```
reflect :
        lw.  e    $123,boardsize($0); move $114, $6;  move $113, $5
        mult      $113, $123;   slti $115, $114, 2;  move $112, $4
        nop;      lw. e $117,boardsize($0);  addiu $116, $113.1
        nop;      bne $115, $0, $L109;  subu $113, $117, $116

$L109:  mflo     $124;   addiu $118, $0, 1; aaddiu    $119, $0, 3
        nop :    beq $114, $118, $L111; nop
        nop :    bne $114, $119, $L110; nop $L111:  addiu    $120, $112, 1;  lw. e $121,boardsize($0);   nop
        subu     $112, $121, $120; nop: nop $L110:  addiu    $2, $124, $112;  jr $31;   nop
```

Fig. 25

```
reflect :
3: lw.e $123, boardsize($0);   1: move $114, $6;   1: move $113, $5
3: mult $113, $123;   1: slti $115, $114, 2;   2: move $112, $4
3: nop;   3: lw.e $117, boardsize($0);   3: addiu $116, $113, 4
3: nop;   1: bne $115, $0, sL109;   3: subu $113, $117, $116
3: nop;   1: nop;

sL109:
3: mflo;   1: addiu $118, $0, 1;   3: addiu $119, $0, 3
3: nop;   1: beq $114, $118, sL111;   3: nop
1: nop;   1: bne $119, $119, sL110;   1: nop sL111:
1: addiu $120, $112, 1;   1: lw.e $121, boardsize($0);   1: nop
1: subu $112, $121, $120;   1: nop;   1: nop sL110:
1: addiu $2, $124, $112;   1: jr $31;   1: nop
```

Fig. 26

```
reflect:
3: lw.e       $123, boardsize ($0); 1: move  $114, $6;  1: move  $113, $5
3: mult       $113, $123;            1: slti $115, $114, 2;  2: move  $112, $4
3: nop
3: lw.e       $117, boardsize ($0); 3: addiu $116, $113
3: nop        
1: cmt.ne     $115, $0,;             3: subu  $113, $117, $116
              {2_1, 2_3, 3_1, 3_2, 3_3|, |2_3, 3_3}
3: mflo;      $124;  1: addiu $118, $0, 1;  3: addiu $119, $0, 3
3: nop;       1: bcmt.eq $114, $118, $L111,;  3: nop
              {1_3, 2_1, 3_3, 3_4|, |3_3, 3_4}
1: nop;       1: bcmt.ne $114, $119, $L110,;  1: nop
              {1_1, 2_1, 3_1|, }{

$L111:
1: addiu      $120, $112, 1;  1: lw.e $121, boardsize ($0); 1: nop
1: subu       $121, $121, $120;  1: nop;  1: nop $L110:
1: addiu      $2, $124, $112;  1: rcmt $31,;  1: nop
              {1_1, 2_1}
```

Fig. 27

```
reflect:
 3:lw. e $_1. boardsize ($0); 1:move P:$_1. S6: 1:move P:$3.$5
 3:mult $3, $_1; 1:slti $_1. $_1.2: 2:move P:$7, $4
 3:nop: 3:lw. e P:$3_2, boardsize ($0): 3:addiu $_1. $3. 1
 3:nop: 1:cmt. ne $_1, $0,: 3:subu $3, $_2. $_1
           |2_1, 2_3, 3_1, 3_2, 3_3|, |2_3, 3_3|
 3:mflo P:$_2; 1:addiu $_2, $0, 1: 3:addiu P:$2_3, $0, 3
 3:nop: 1:bcmt. eq $_1, $_2, $L111,: 3:nop
           |1_3, 2_1, 3_3, 3_4|, |3_3, 3_4|
 1:nop: 1:bcmt, ne $_1, $_3, $L110,: 1:nop
           |1_1, 2_1, 3_1|, ||
$L111:
 1:addiu $_3. $7. 1: 1:lw. e P:$1_4, boardsize ($0): 1:nop
 1:subu $7, $_4. $_3; 1:nop: 1:nop
$L110:
 1:addiu $2. $_2, $7: 1:rcmt $31,; 1:nop
                     |1_1, 2_1|
```

Fig. 28

CENTRAL PROCESSING APPARATUS AND A COMPILE METHOD

FIELD OF THE INVENTION

The present invention relates to a central processing apparatus and a method of compiling for effectively assigning instructions of a program to a plurality of buffers respectively connected to a plurality of execution units in order to execute the instructions in parallel.

BACKGROUND OF THE INVENTION

To improve calculation systems, instructions are executed in parallel. Several factors such as control dependency and data dependency impede parallel operations. Because of a control dependency, an instruction of a branch destination is not executed until an instruction to output a branch condition is completed and the branch condition is determined. Because of a data dependency, an instruction to consume data is not executed until other instructions to generate the data are completely executed. To sufficiently increase parallel operation, a method to speculatively release these dependencies is necessary.

As a method to execute instructions including dependencies with each other in parallel, a "predicated execution" and a "branch prediction method" are selectively used for controling the dependency, and "dependence collapsing" and "value prediction" are selectively used for the data dependency.

In "predicated execution", a new source operand called "predicate" is assigned to an instruction, and the instruction is executed or not depending on the truth of the "predicate". FIG. 1 shows one example of program code without a "predicate" instruction. In this example, if a value of register r3 is equal to a value of register r4, the execution branches label L2 by a condition branch instruction "beq". If the values are not equal, the next instruction for the condition branch instruction "beq" is executed. FIG. 2 shows the same program code as in FIG. 1, but using a "predicate". Refering to (1) "pseq" instruction (the predicate set instruction), if the value of register r3 is equal to the value of register r4, "1" is set in P1 as a predicate value and "0" is set in P2 as a predicate value. On the other hand, if the values are not equal, "0" is set in P1 and "1" is set in P2. Furthermore, as shown in (2)~(4) of FIG. 2, as for the predicate instruction such as <P1> or <P2>, if "1" is set as a variable in "< >" by "pseq" instruction, the execution result of the instruction is reflected to a register. On the other hand, as for a non-predicate instruction as shown in (5) of FIG. 2, the execution result is always reflected in the register. Accordingly, in the program code of FIG. 2, if the value of register r3 is equal to the value of register r4, "1" is set as P1 and "0" is set as P2 by "pseq" instruction. In this case, the execution results of <P1> instruction "s11 r6, r10, 2", "li r5, 1" and non-predicate instruction "move r2, r5" are only reflected in the register. In short, the same result as the case of branch to L2 in FIG. 1 is obtained. In the same way, if the value of register r3 is not equal to the value of register r4, "0" is set as P1 and "1" is set as P2. In this case, the execution results of the <P2> instruction "li r5, 0" and the non-predicate instruction "move r2, r5" are only reflected in the register. In short, the same result as the case of non-branch to L2 in FIG. 1 is obtained. As an embodiment of predicate execution, a first method is that an instruction is executed irrespective of the truth of the "predicate" and the execution result of the true instruction is reflected as the status in case of decision of truth. A second method is that the instruction is not executed until the truth of the "predicate" is determined and only the true instruction is executed. The first method can only execute in parallel instructions including a control dependency.

In the "branch prediction method", a branch destination of the condition branch instruction is predicted before the condition is determined. As the prediction method, a first static method for indicating the branch destination (For example, if the condition branch instruction repeats a loop, the repeat is always predicted), a second dynamic method for predicating using an exclusive hardware (For example, a branch direction is recorded whenever the branch instruction is executed; when executing the next branch instruction, the branch direction of a previous branch instruction is used), and a combination of the first static method and the second dynamic method, are selectively used. Various means for realizing each method are proposed. An operation apparatus speculatively executes an instruction of prediction destination and decides whether the prediction is correct when a condition of predicted branch instruction is determined. If the prediction is correct, the speculative execution result is reflected in a state of the operation apparatus. If the prediction is erroneous, the speculative execution result is abandoned and an instruction for the correct branch destination is executed.

In "dependence collapsing", instruction lines (a plurality of instructions) including the data dependency are converted into one instruction. This one instruction is executed by a special operation unit. Mainly, this method is used for multimedia operations or floating-point operations.

In "value prediction", an execution result of an instruction is predicted before input data necessary for the instruction is determined. In this case, output data of other instructions depending on the instruction in the program is predicted, and the instruction is executed using the predicted output data. In this way, two instructions including the data dependency are executed in parallel. As a method to predict the output data, the previous output result of the instruction is recorded, and this output data is used as the next prediction value. Otherwise, an instruction whose output value changes by predetermined rule for example, the output value increases or decreases by predetermined ratio; several kinds of values are repeatedly output by predetermined order is found, and the output data is predicted by the predetermined rule. This "value prediction" is studied at present. Both an applicable ratio of prediction (a ratio of the number of instructions actually applied to the prediction and the number of dynamic instructions necessary for the prediction) and a hit ratio of prediction (a ratio of the number of instructions of correct prediction and the number of instructions applied to the prediction) are not so high. A general operation unit to use this method does not exist.

In the above-mentioned parallel execution method of an instruction including a dependency, as for "predicated execution", though an instruction existing along one direction of a branch destination in the program is not necessary to be executed, two instructions existing along two directions of a branch destination are executed. In this case, the operation unit is detained by the unnecessary instruction. Accordingly, the execution ratio of effective instruction goes down, and the execution ratio of all instructions also goes down.

Furthermore, in "predicated execution", a control dependency relation between the instructions is converted to a data dependency relation through "predicate". The instruction sequence to set "predicate" (an instruction to set a condition of branch instruction before conversion) and the instruction sequence to input "predicate" (an instruction of branch destination before conversion) still depend on each other. Accordingly, these instructions are located in order of dependency in the program code. As a result, in order to execute an instruction located over a plurality of branch instructions in the program out of order, an apparatus to decide whether the instruction is executed out of order (For example, an instruction window for superscalar) must prepare a large number of entries.

In "branch prediction method", if the branch destination of the branch instruction is erroneously predicted, all instructions to be executed after the branch instruction are unnecessary instructions in the worst case. Even if a hit ratio of prediction of each branch instruction is high, a probability that a plurality of branch predictions are continuouslly hit is low. Accordingly, the execution of the instruction located over a plurality of branch instructions in the program is useless in many cases. Furthermore, instructions, each including a control dependency, are not located in parallel in the program code. As a result, in order to execute the instruction located over a plurality of branch instructions in the program out of order, large scale hardware is necessary in the same way as "predicated execution".

In "dependence collapsing", the operation time of a complicated instruction such as a floating-point operation is reduced. However, the operation time of a simple instruction is not so reduced. In addition to this, a special operation unit to execute the converted instruction is necessary.

In "value prediction", by predicting an output result of a particular instruction, the next instruction sequence located after the particular instruction and other instruction sequences including a data dependency to the particular instruction in the program are executed in parallel. However, in order to confirm whether the prediction is correct, these instruction sequences must be located in the original order of data dependency. Accordingly, in the same way as "predicated execution" and "branch prediction method", in order to sufficiently execute the instructions out of order, the execution decision apparatus preparing many entries is necessary.

SUMMARY OF THE INVENTION

It is an object of the present invention to provide a central processing apparatus and a method of compiling able to effectively execute instructions out of order in a wide area of the program.

According to the present invention, there is provided a central processing apparatus for assigning instructions of a program to a plurality of buffers respectively connected to one of a plurality of execution units, the plurality of execution units respectively executing the instruction by accessing a memory and a global register, wherein the program consists of a plurality of instruction sequences each including a data dependency, a control dependency between the instruction sequences is represented by a commit instruction, an instruction of data production or data consumption includes a flag representing possession of a register number in the global register accessed by the instruction, the central processing apparatus comprising: a task window number generator configured to assign a task window number to the instruction sequences belonging to a task window, the task window being at the end by the commit instruction; an assignment unit configured to assign the instructions to the plurality of buffers, each instruction sequence corresponding to one buffer to assign each instruction of the instruction sequence; a register update unit configured to update data in the register number accessed by a particular instruction sequence in a task window if the particular instruction sequence is accepted by the commit instruction in the task window; and a memory update unit configured to update data in the memory whose address is accessed by a particular instruction sequence in a task window if the particular instruction sequence is accepted by the commit instruction in the task window.

Further in accordance with the present invention, there is also provided a compile method for generating a program executed by a central processing apparatus for assigning instructions of the program to a plurality of buffers respectively connected to one of a plurality of execution units, the plurality of execution units respectively executing the instruction by accessing a memory and a global register, comprising the steps of: dividing the program into a plurality of instruction sequences each including a data dependency; generating a commit instruction instead of a condition instruction representing a control dependency between the instruction sequences in the program; assigning a flag to an instruction of data production or data consumption, the flag representing possession of a register number in the global register accessed by the instruction; and assigning a task number to each instruction in the instruction sequences belonging to a task window, the task window being at the end by the commit instruction.

Further in accordance with the present invention, there is also provided a computer readable memory containing computer readable instructions in a computer for assigning instructions of a program to one of a plurality of buffers respectively connected to a plurality of execution units, the plurality of execution units respectively executing the instruction by accessing a memory and a global register, comprising: an instruction means for causing the computer to divide the program into a plurality of instruction sequences each including a data dependency; an instruction means for causing the computer to generate a commit instruction instead of a condition instruction representing a control dependency between the instruction sequences in the program; an instruction means for causing the computer to assign a flag to an instruction of data production or data consumption, the flag representing possession of a register number in the global register accessed by the instruction; and an instruction means for causing the computer to assign a task number to each instruction in the instruction sequences belonging to a task window, the task window being at the end by the commit instruction.

BRIEF DESCRIPTION OF THE DRAWINGS

FIG. 1 is an example program without a predicate instruction.

FIG. 2 is an example program including a predicate instruction.

FIG. 6 is a schematic diagram of a data structure of a queue.

FIG. 9 is a schematic diagram of component of a store buffer.

FIG. 10 is a schematic diagram of component of a load buffer.

FIG. 13 is an example of a program without a cmt instruction.

FIG. 14 is an example of a program including a cmt instruction.

FIG. 15 is an example of a program without a bcmt instruction.

FIG. 16 is an example of a program including a bcmt instruction.

FIG. 17 is an example of a program without a lcmt instruction.

FIG. 18 is an example of a program including a lcmt instruction.

FIG. 19 is an example of a program including a dcmt instruction.

FIG. 23 is an example of a program described by pseudo register.

FIG. 24 is a schematic diagram of the data dependence sequences in the program shown in FIG. 23.

FIG. 25 is an example of the program of FIG. 23 in which the data dependence sequences are speculatively moved.

FIG. 26 is a example of the program of FIG. 25 in which a task number is assigned.

FIG. 27 is an example of the program of FIG. 26 in which a condition instruction is converted to a commit instruction.

FIG. 28 is an example of the program of FIG. 27 in which a flag is assigned to the instruction of data production.

DETAILED DESCRIPTION OF THE PREFERRED EMBODIMENTS

Figure 3:
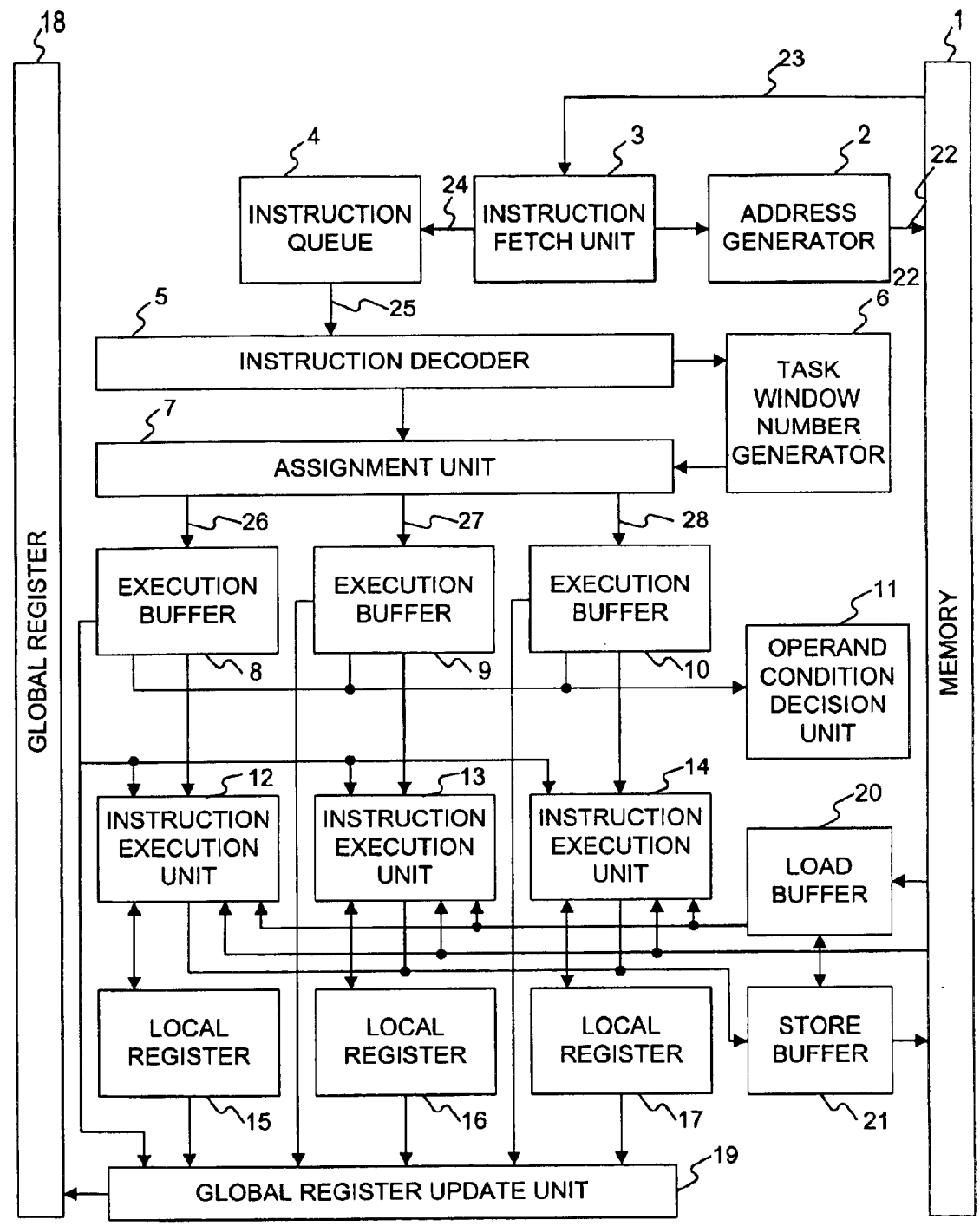
FIG. 3 is a block diagram of a processor according to an embodiment of the present invention.

Hereinafter, an embodiment of the present invention will be explained by referring to the drawings. FIG. 3 is a block diagram of components of a processor (a central processing apparatus) according to the present invention. As shown in FIG. 3, the processor includes a memory 1, an address generator 2, an instruction fetch unit 3, an instruction queue 14, an instruction decoder 5, a task window number generator 6, an assignment unit 7, execution buffers 8, 9, 10, an operand condition decision unit 11, instruction execution units 12, 13, 14, local registers 15, 16, 17, a global register 18, a global register update unit 19, a load buffer 20, and a store buffer 21. In FIG. 3, the number of instruction execution units 12, 13, 14 (three) represents one example. The unit number is not limited to this. Furthermore, in FIG. 3, the register consists of the global register 18 accessed by all instructions and a plurality of local registers 15, 16, 17 accessed by an instruction belonging to a corresponding instruction execution unit. However, only the global register 18 may be used.

In the present invention, an instruction sequence including a data dependency, regarded by a compiler, is called a task. In short, an instruction belonging to the task is related to other instructions belonging to the same task as the data dependency. The other instruction is located before the instruction in the program. Furthermore, instruction sequences consisting from an instruction located just behind a commit instruction to the next commit instruction are called a task window. In short, the last instruction in the task window is a commit instruction. Each task window includes only one commit instruction. The task window consists of a plurality of tasks (instruction sequences). Each task consists of a plurality of instructions. In the present embodiment, in order to discriminate the task to which each instruction belongs, a task number unique to the task is assigned to each instruction belonging to the task by the compiler. Furthermore, in order to discriminate the task window to which each instruction belongs, a task window number unique to the task window is assigned to each instruction belonging to the task window by the task window number generator 6.

In FIG. 3, an outline of the main units in the processor is explained. The task window number generator 6 generates the task window number to assign to a decoded instruction. A program running on the processor may contain at least two task windows. Each of the at least two task windows within the program is assigned a different number. For example, a task window number of present task window is incremented by "1" and this incremented task window number is assigned to next task window. The task window number generator 6 is realized by a loop counter whose maximum value is above "2".

The execution buffers 8, 9, and 10 are respectively connected to one of the instruction execution units 12, 13, and 14. Each decoded instruction within the program running on the processor has an address. Decoded instructions within the program are assigned to a particular execution buffer according to the decoded instruction's address. Each execution buffer consists of a plurality of queue. Each queue in the execution buffer previously corresponds to one task number. Therefore, the assignment unit 7 decides which execution buffer to assign a decoded instruction according to the address of the decoded instruction, decides the queue to insert the decoded instruction according to the task number of the decoded instruction, and inserts the decoded instruction to the queue in the execution buffer in order (first in, first out). The instructions in the plurality of queues of the execution buffer are executed in order of insertion by the instruction execution unit.

The operand condition decision unit 11 decides whether an operand in the decoded instruction is usable. The global register 18 consists of a plurality of registers and a register number is assigned to each register. The operand in the decoded instruction represents the register number. Accordingly, the operand condition decision unit 11 decides whether a register of the register number represented by the operand is usable in the global register 18.

The global register update unit 19 updates data in a register of the global register 18 according to an instruction accepted by the commit instruction. In this case, the global register update unit 19 controls to update the global register by unit of one accepted instruction.

The load buffer 20 decides whether a store instruction on which a load instruction depends is registered in the store buffer 21. If a store instruction is registered in the store buffer 21, the load buffer 20 loads the necessary data of the store instruction from the store buffer 21. If a store instruction is not registered in the store buffer 21, the load buffer 20 loads the necessary data from the memory 1 (or a cache memory).

The store buffer 21 temporarily preserves data of the store instruction (For example, memory address, a value to be stored). After this store instruction is accepted by the commit instruction, the store buffer 21 updates data in the corresponding address of the memory in order of preservation of the store information.

Generally, in the processor of the present invention, a plurality of instructions are assigned (inserted) to the queue in the execution buffer corresponding to the task number of each instruction. The instructions in the plurality of queues of the execution buffer are executed in order of assignment by the instruction execution unit connected to the execution buffer. The execution result of an instruction to update the global register is temporarily preserved in the local register, and the execution result of an instruction to update the memory is temporarily preserved in the store buffer. Then, only the execution result of the instruction accepted by the commit instruction is formally stored in the global register or the memory. In short, limitation on the location of the instructions by the data dependency and the control dependency are removed. As a result, the size of the buffer necessary to extract the parallelism is reduced. Furthermore, the instruction execution unit extracts an executable instruction as a head instruction from respective queue in one execution buffer in order of assignment. Accordingly, selection processing time of the instruction is reduced, and the instructions located behind a branch instruction or a data dependent instruction are speculatively executed.

Figure 4:
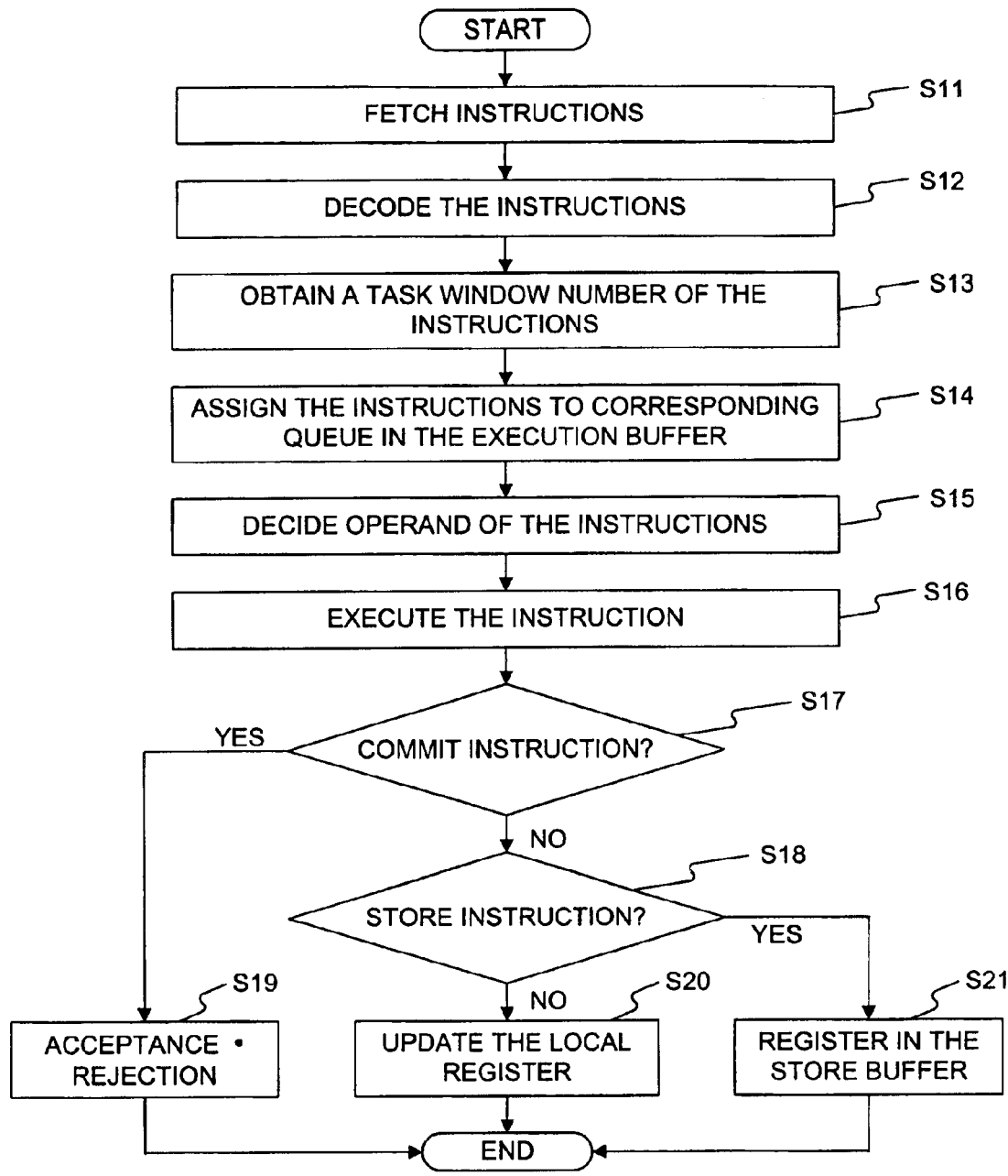
FIG. 4 is a flow chart of pipeline processing according to an embodiment of the present invention.

FIG. 4 is a flow chart of pipeline processing of the processor according to the present invention. The address generator 2 indicates an instruction address to the memory 1 by an address bus 22. The instruction fetch unit 3 fetches a plurality of instructions based on the instruction address from the memory 1 (or the cache memory) by an instruction fetch bus 23 (S11). The fetched instructions are inserted into the instruction queue 4 by an instruction queue bus 24 in the order fetched. If the instruction queue 4 is full, the instruction fetch unit 3 stops the next fetch until the instruction queue 4 includes a space. The address generator 2 is normally updated to indicate the next address after the last fetched instruction. However, if a jump instruction is accepted or if an lcmt instruction (loop commit instruction) is fetched, the address generator is updated to indicate the address represented by the jump instruction or the lcmt instruction. The instruction decoder 5 decodes a plurality of instructions from a head instruction stored in the instruction queue 4 through a decode bus 25 and obtains a class, an operand, a production/consumption flag, and a task number of each instruction (S12). Furthermore, the instruction decoder 5 obtains a task window number of each instruction from the task window number generator 6 and sends this information to the assignment unit 7. The assignment unit 7 selects one queue in one execution buffer into which to insert the instruction by referring to the information sent from the instruction decoder 5, and the assignment unit 7 inserts the instruction into the selected queue in the selected execution buffer through the execution buffer bus 26, 27, or 28 (S14). If the selected queue is full, the insertion waits until the selected queue includes a space. The instruction decoder 5 stops decode processing of the instruction during this period. Furthermore, if the execution buffer includes a commit instruction not executed yet and the instruction decoder 5 decodes the next commit instruction, the instruction decoder 5 executes the same processing. The assignment unit 7 determines the instruction execution unit to execute the instruction by its instruction address.

Figure 5:
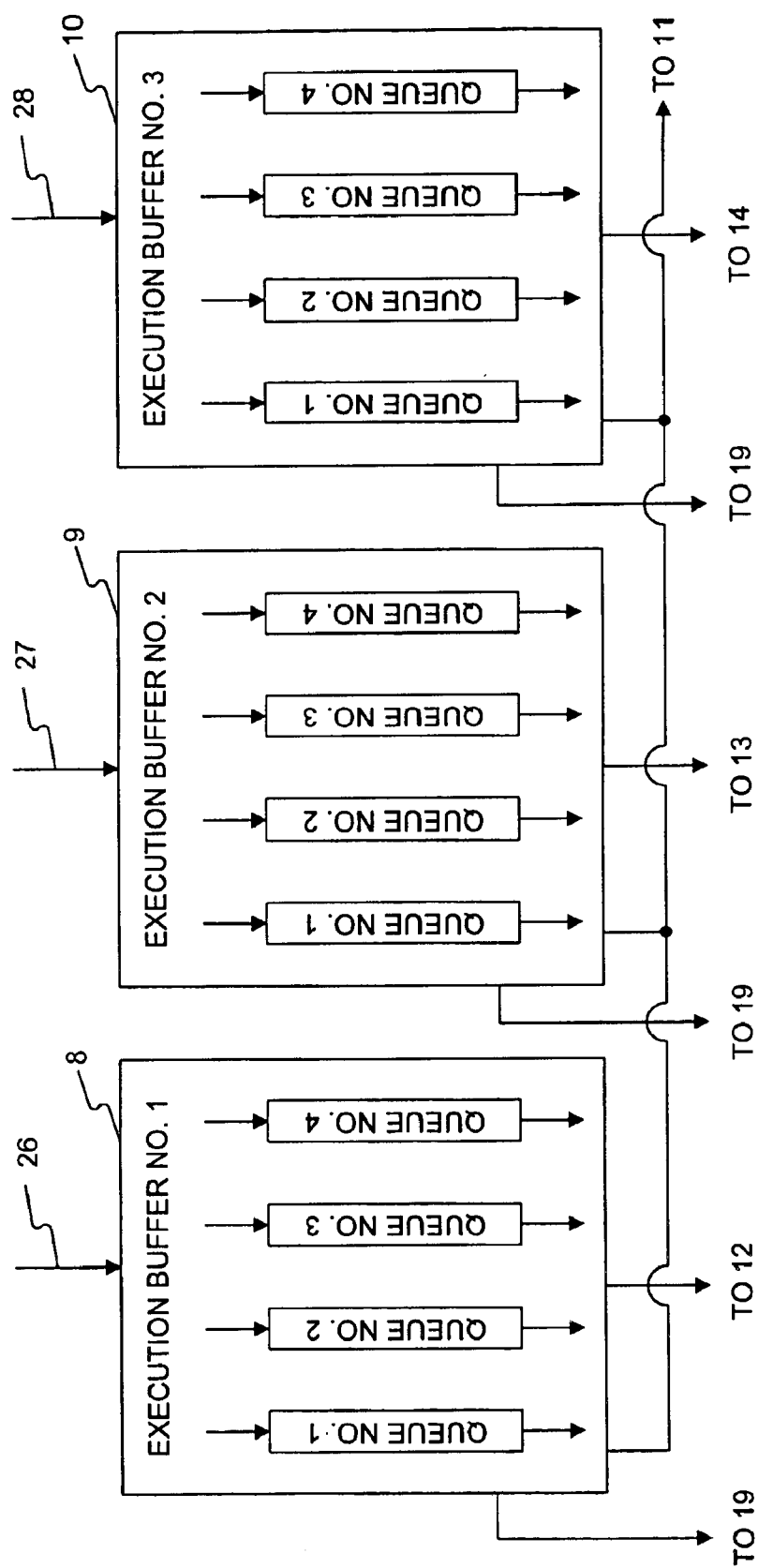
FIG. 5 is a schematic diagram of a component of an execution buffer.

Next, a method to select the queue in the execution buffer is explained in detail. FIG. 5 shows an example of the components of an execution buffer. For example, as shown in FIG. 5, each execution buffer consists of four queues. If the processor executes the program in parallel three instructions at a time, a first instruction is assigned to the execution buffer No. 1, a second instruction is assigned to the execution buffer No. 2, and a third instruction is assigned to the execution buffer No. 3. In short, the execution buffer is selected by the address of the instruction in the program. In each execution buffer, each queue differently corresponds to one task number. If the task number of the first instruction is "1", the first instruction is inserted into the queue No. 1 in the execution buffer No. 1. If the task number of the second instruction is "2", the second instruction is inserted into the queue No. 2 in the execution buffer No. 2. In short, the queue is selected by the task number of the instruction. As explained afterward, the task number may include the address of the instruction. For example, if the task number of the first instruction is "1", the task number may be represented as "1_1", wherein the former numeral "1" represents the address of the instruction and the latter numeral "1" represents the task number. In this case, both the one execution buffer and the one queue in the one execution buffer are selected by the task number.

FIG. 6 shows an example of component of the queue. In this example, the queue is composed as a ring buffer. In the queue, four pointers (1. head, 2. tail, 3. execute, 4. commit) exists. A head pointer and a tail pointer respectively represents a head entry and an end entry registered in the ring buffer. An execute pointer represents an entry to be executed next. The execute pointer is moved to point to the next entry after the instruction is executed. A commit pointer represents an instruction to update a global register/memory. The commit pointer is moved to the next instruction to update the global register/memory after the update completes. As shown in FIG. 6, each entry (instruction) in the queue consists of a plurality of fields (a class of instruction, operand data, exceptional data). If an instruction not accepted/rejected causes an exception, information for the exception is recorded as the exceptional data and the exceptional processing is delayed after this instruction is accepted.

Figure 7:
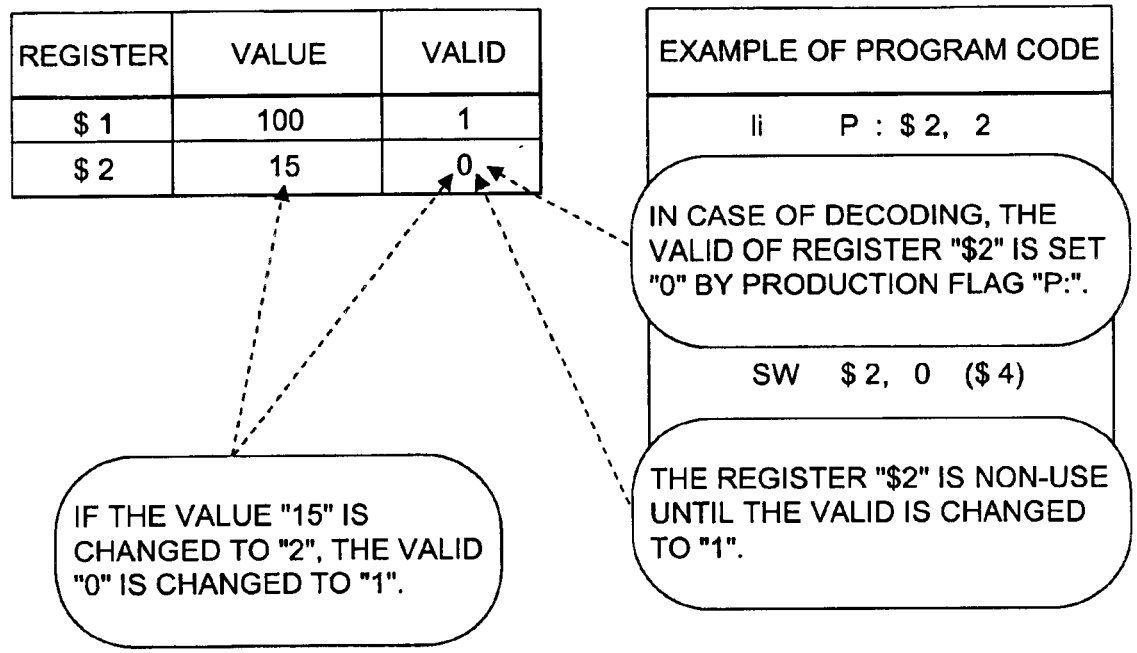
FIG. 7 is a schematic diagram of a register score board in an operand condition decision unit.

The operand condition decision unit 11 decides whether an operand of each head instruction stored in the queue of the execution buffer 8~10 is usable (S15). If the operand is usable and the instruction execution unit to execute the instruction is idle, the instruction is transferred to the instruction execution unit through a corresponding instruction bus. After the operand is fetched from the grobal register 18 or the local registers 15~17, the instruction is executed. The operand condition decision unit 11 decides whether the operand is usable or not by referring to a register score board shown in FIG. 7. If an instruction including a production/consumption flag is decoded, a valid bit corresponding to a register represented by the flag is set to "0" in the register score board. When a value in the register is updated, the valid bit is set to "1". If the valid bit of all operands used by the instruction is "1", the operand condition decision unit 11 decides that the instruction is executable. In this case, a part of the executable instruction is not often executed by limit of resources (1. number of instruction execution units, 2. number of read ports of the global register, 3. number of read ports of the data cache, 4. number of write ports of the store buffer, 5. number of entries of the store buffer, 6. number of entries of the load buffer).

The operand condition decision unit 11 selects an instruction from a plurality of executable instructions according to a predetermined rule and sends the instruction to the instruction execution unit. As one example of the predetermined rule, an instruction inserted at the oldest time into the queue in the execution buffer connected to one instruction execution unit is selected first. Among the instructions stored in all execution buffers, an instruction in the execution buffer connected to the instruction execution unit of the highest priority is selected first. Furthermore, a compiler indicates the queue in the execution buffer to insert the instruction, and the instruction is assigned to the queue in the execution buffer to ease limited resources. In this case, it is not necessary that a priority order of instructions belonging to different instruction execution units is taken into consideration. For example, if the store buffer includes only one write port, a store instruction is assigned to the execution buffer connected to a specified instruction execution unit and it is not necessary that the limited resources of write ports of the store buffer is examined.

Furthermore, irrespective of the assignment of the instruction to the execution buffer by the compiler, a predetermined task number is assigned to a speculative task. Among a plurality of instructions belonging to the same instruction execution unit, a non-speculative instruction is executed before a speculative instruction. By using this rule, the execution unit does not speculatively execute an instruction unnecessary to execute. If an exception is caused in case of executing the instruction, a class of the exception is recorded in entry of the instruction of the queue, and the exceptional processing is not executed at this timing.

After executing the instruction, the execution result is output to the local register in case of the instruction to output to the register (S20). Furthermore, the execution result is registered to the store buffer 21 in case of the instruction (store instruction) to output to the memory (S21). When the commit instruction is executed, the commit instruction accepts some tasks and rejects other tasks according to the indicated condition (S19). If the instruction to output to the global register is accepted, a value of the local register to preserve the execution result and a global register number are sent to the global register update unit 19. If more instructions than the number of write ports of the global register update unit are accepted, these instructions are registered in order of a predetermined priority. As the predetermined priority, for example, the priority order decided by the operand condition decision unit 11 is used. The global register update unit 19 updates a predetermined number (the number of write ports) of values in the global register in order of registration for one cycle independent of the pipeline. Each instruction execution unit prepares two local register sets. As for the instruction whose task window number is an even number and the instruction whose task window number is an odd number, different local registers set are used.

On the other hand, if an instruction to output to the memory is accepted, the store buffer 21 updates a predetermined number (the number of write ports of the data cache) of values in the memory in order of registration independent of the pipeline. If an instruction for recording the class of exception is accepted, the exceptional processing based on the class of exception is executed. An instruction to output the local register and an instruction not including output are erased from the execution buffer without update processing after acceptance/rejection of these instructions. An erasure of the instruction in the execution buffer is realized by moving the head pointer in each queue.

Figure 8:
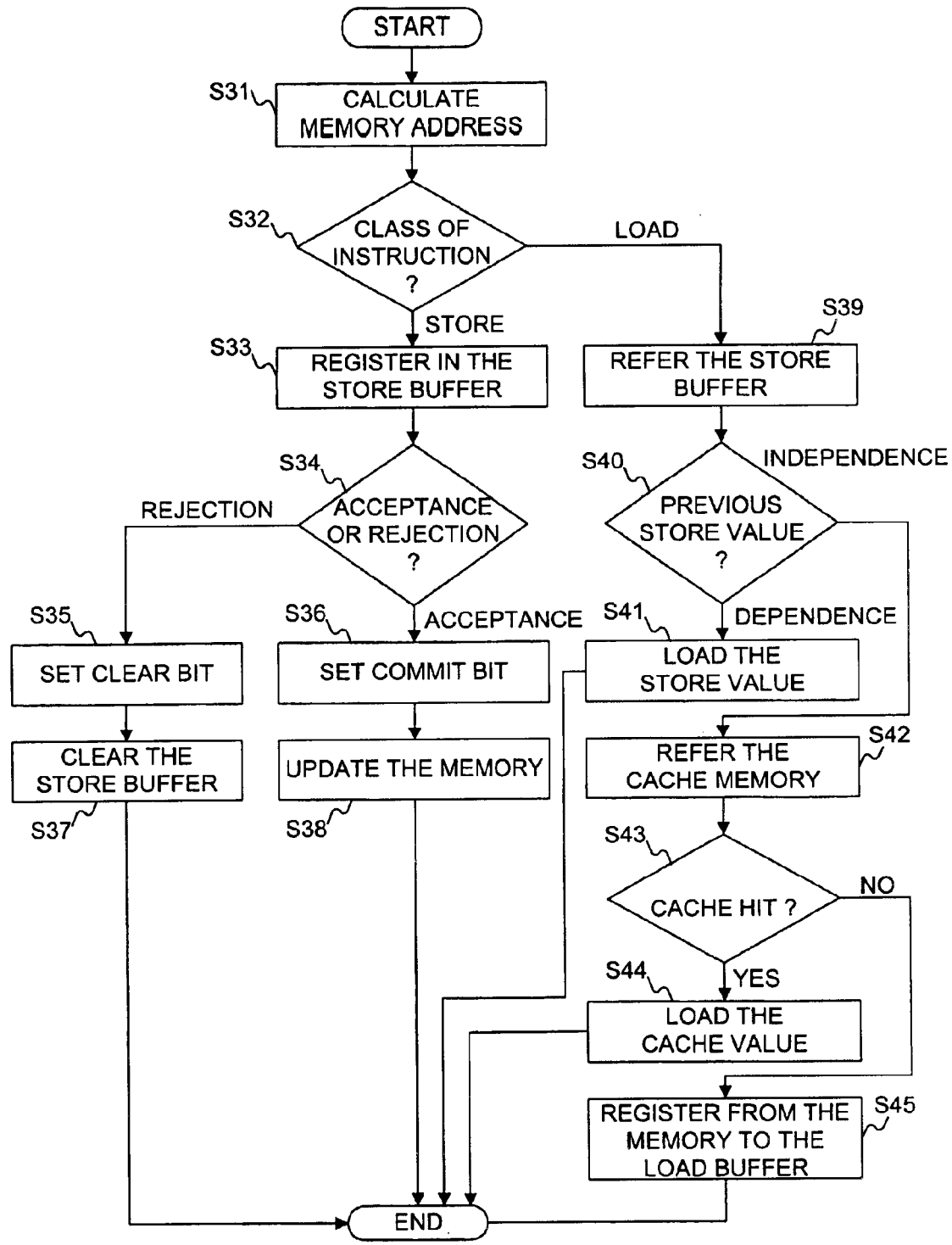
FIG. 8 is a flow chart of processing of a load instruction and a store instruction according to an embodiment of the present invention.

Next, FIG. 8 is a flow chart of processing of executing the load instruction/store instruction by the processor according to an embodiment of the present invention. The store instruction is not executed in two cases: 1. The store buffer is full, or 2. A previous store instruction whose task number is equal to the present store instruction exists in the store buffer, and a task window of the previous store instruction is different from a task window of the present store instruction. First, when the store instruction is sent to the instruction execution unit, a memory address to store the execution result is calculated (S31). Next, after deciding the class of instruction (S32), information of the store instruction is registered in the store buffer 21 (S33).

FIG. 9 shows an example of a component of the store buffer. In this example, the store buffer is composed as a ring buffer. Each entry in the store buffer consists of a store address, a store value, a store width (word data, byte data, etc), a task window number of the store instruction, a commit bit, and a clear bit. When the store instruction is registered in the store buffer, these elements are set in the entry. The commit bit and the clear bit are set to "0". If the store instruction is accepted by the commit instruction (S34), the commit bit in the entry of the store instruction is set to "1" (S36). If the store instruction is rejected (S34), the clear bit in the entry of the store instruction is set to "1" (S35). When the commit bit of a head entry in the store buffer is set to "1", the memory is updated using information (store address, store value, and store width) of the entry, and a head pointer representing a head entry in the store buffer is moved to the next entry (S38). On the other hand, when the clear bit of the head entry is set to "1", the head pointer is moved to the next entry and the memory is not updated (S37).

Next, an example of execution of a load instruction is explained. As for the load instruction, in addition to the above-mentioned conditions for an executable instruction, if a condition that all store instructions in a previous task window are already executed (registration to the store buffer is completed) or rejected by the commit instruction is satisfied, the operand condition decision unit 11 decides that the load instruction is executable. When the load instruction is sent to the instruction execution unit, the memory address to be loaded is calculated (S31). Next, after deciding a class of the instruction (S32), the store buffer is referred, and it is determined whether a store instruction including a memory dependency for the load instruction is registered in the store buffer (S39).

A decision whether the load instruction dependently relates to the store instruction registered in the store buffer is executed by a predetermined standard. The compiler executes an instruction schedule so that a dependent relation between the load instruction and the store instruction is represented by this standard. As one example of the standard, the load instruction depends on the store instruction to update a load area which satisfies one of two conditions: 1. The store instruction belongs to a previous task window compared with a task window of the load instruction, or 2. The store instruction belongs to the same task as the load instruction and is located before the load instruction. If the store instruction depending on the load instruction exists in the store buffer, a store value of the store instruction most recently registered in the store buffer (a part of the store value in case of the store width larger than the load width) is used as the output of the load instruction (S41). On the other hand, if the store instruction depending on the load instruction does not exist in the store buffer, data cache is addressed (S42). If the load area hits the data cache (S43), a value in the data cache is loaded and the load instruction is completed (S44). On the other hand, if the load instruction causing a data cache miss or a page fault exception, it is registered in the load buffer 20 (S45).

FIG. 10 shows an example of a component of the load buffer. In this example, the load buffer is composed as a ring buffer. Each entry in the load buffer consists of a load address whose lower several bits are masked by "0" (it is called a "cache address"), a register field consisting of plural register numbers (register field), a valid field, and a refill bit. The number of register numbers in the register field represents the number of words in one line of the data cache. A number "n" of bits to be masked in the cache address is determined so that "n" power of 2 is equal to the number of bytes in the cache line. In FIG. 10, the cache line of eight words is shown. The register field represents that a word in the cache line is loaded into a register represented by the register number in order of MSB. The valid field represents whether the register number in the register field is valid or not (1: valid). The load to an invalid register is not executed.

Figures 11, 12:
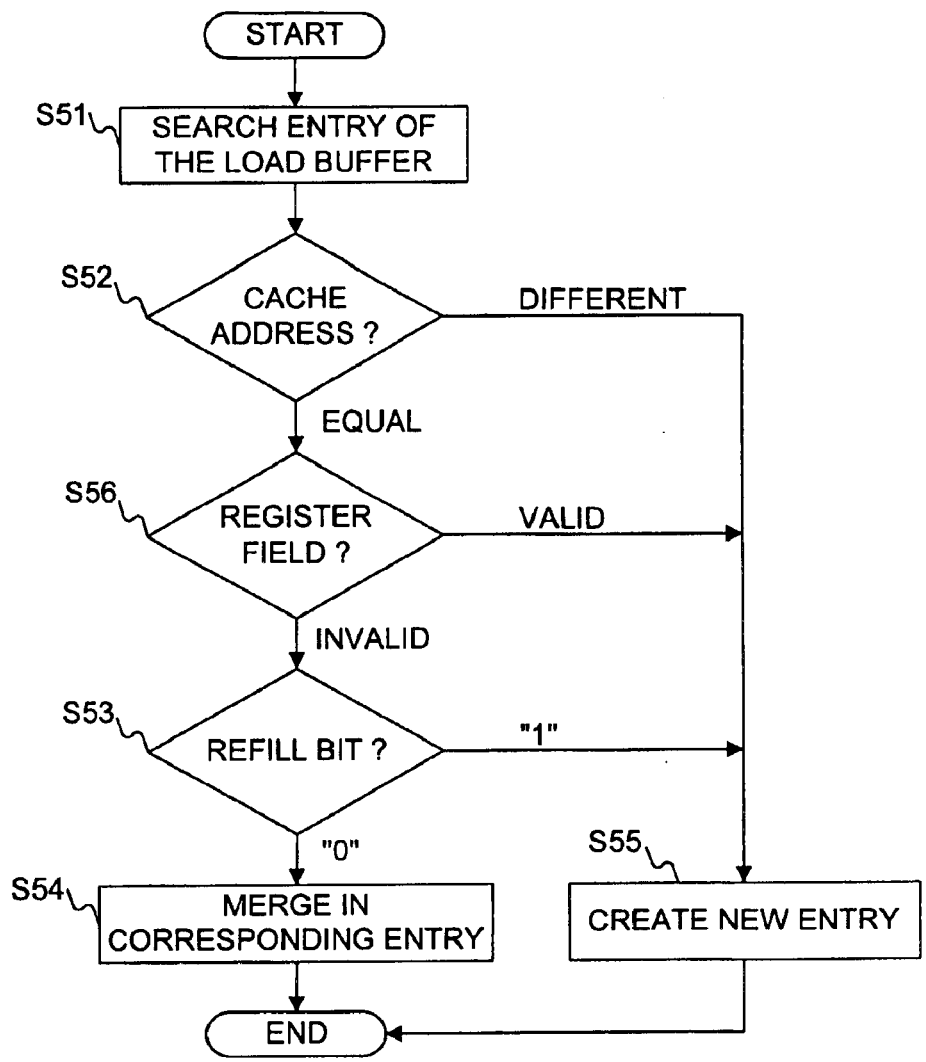
FIG. 11 is a flow chart of processing to register the load instruction in the load buffer.
FIG. 12 is a schematic diagram of a component of a conflict buffer.

FIG. 11 is a flow chart of processing of registering the load instruction to the load buffer. First, it is examined whether an entry including an address equal to the cache address of the load instruction exists in the load buffer (S51, 52). If the entry exists in the load buffer, it is examined whether a corresponding register field of output of the load instruction is valid or not by referring to a corresponding valid field in the entry (S56). If the entry including an address equal to the cache address of the load instruction does not exist in the load buffer or if the output register of the load instruction is not registered in the register field for an existing entry (corresponding register field is already valid, or refill bit of this entry is "1"), a new entry is created in the load buffer and the load instruction is registered in the new entry (S55). In this case, the refill bit is set to "0".

On the other hand, if an entry including a cache address of the load instruction exists in the load buffer and a field corresponding to an output register of the load instruction in the entry is invalid, a register number of the output register is stored in a corresponding register field in the entry and the valid field corresponding to the register number is set to "1" (S54). If any valid bit in a head entry is "1" and a refill bit in the head entry is "0", data corresponding to a cache address in the head entry is read from the memory. After reading the data, the refill bit in the head entry is set to "1". After setting the refill bit to "1", a load to an effective register in the register field is executed in order from R1 to R8. After completing the load to all effective registers, a head pointer is moved to the next entry in the load buffer.

In the present invention, two classes of load instructions (1. a load instruction to be executed as soon as it is executable, 2. a load instruction (delayed-load) not to be executed until it is accepted by a commit instruction even if it is executable) are considered. The delayed-load instruction is set to belong to next task window of the commit instruction. In this case, a limit of instruction location by dependence relation (memory dependence relation) of the load instruction and the store instruction is reduced. In short, a load instruction to be located in a specified task window by the memory dependence relation is intentionally converted to a delayed-load instruction. As a result, this load instruction is originally located in a task window located before the specified task window. The delayed-load instruction provides effects such as an improvement in code density and a relief from cache miss penalties from instruction prefetch.

Furthermore, in the present invention, as another class of the load instruction, a load instruction (MD-load) independent of a store instruction including vague dependency is used. In case of executing a MD-load instruction, the store buffer is not referenced, and data stored in the memory or the data cache is directly loaded. Information for the MD-load instruction is registered in a memory conflict buffer. FIG. 12 shows an example of components of the memory conflict buffer. In this example, each entry in the memory conflict buffer consists of a plurality of fields: 1. task number of MD-load instruction, 2. load address, 3. load width (word, byte, etc), 4. conflict bit, and 5. valid bit. In case of registering the MD-load instruction in the memory conflict buffer, the conflict bit is set to "0", and the valid bit is set to "1."

The operand condition decision unit 11 decides whether a store instruction is executable. In case that a MD-load instruction belonging to a task window located before another task window of the store instruction is not executed and the MD-load instruction is not accepted/rejected by the commit instruction, the operand condition decision unit 11 decides that the store instruction is not executable. If the store instruction is transferred to the instruction execution unit and a store address is calculated, a MD-load instruction to load an area including the store address is searched for in the conflict buffer. If the MD-load instruction is found, a conflict bit in an entry including this MD-load instruction is set to "1". Before the MD-load instruction is accepted/rejected by the commit instruction, it is necessary to confirm whether the MD-load instruction actually depends on the store instruction by ccmt (check commit) instruction. In this case, it is necessary for the compiler to execute an instruction schedule so that the ccmt instruction is necessarily executed before a task including the MD-load instruction is accepted.

The ccmt instruction is one class of commit instructions, and indicates a task number as a source operand. In this case, a valid bit in effective entry (valid bit is "1") including the indicated task number in the conflict buffer is set to "0". If a conflict bit is "1" in this effective entry, a task of the indicated task number in the effective entry is reexecuted. In order to guarantee a correct condition of the processor by reexecution of the task, it is necessary for the compiler to assign the registers so that an input operand used by a task including MD-load instruction is not reused in a task window including the MD-load instruction. Furthermore, the task assignment is executed so that one task includes one MD-load instruction. By using the above-mentioned system, it is possible that the load instruction is moved forward by passing over the store instruction including vague dependency in the program.

Next, in the present invention, one example of a method for representing a dependency relation between instructions is explained. First, in this example, a control dependency relation between instructions is represented by three classes of commit instructions: 1. cmt instruction, 2. bcmt instruction, 3. lcmt instruction. As for the cmt (commit) instruction, the input consists of a condition expression, an acceptable task set if the condition expression is not satisfied, and a rejectable task set if the condition expression is satisfied.

FIG. 13 shows an example of program code including a condition branch instruction according to the prior art. In FIG. 13, a bne instruction branches to an indicated address if values of two input operands are different.

FIG. 14 show an example in which the program code in FIG. 13 is represented by a cmt instruction instead of a bne instruction according to the present invention. The task number of each instruction is added at the head of each instruction. In case of executing the cmt instruction, the condition expression (In FIG. 14, a value of $3 is not equal to a value of $6) is checked. If the condition expression is not satisfied, tasks belonging to the acceptable task set (In FIG. 14, tasks 1, 2, 3) are accepted. If the condition expression is satisfied, tasks belonging to the rejectable task set (In FIG. 14, tasks 2, 3) are rejected, and a task belonging to the acceptable task set and not belonging to the rejected task set is accepted (In FIG. 14, a task 1). The execution result of instruction belonging to the rejected task is not reflected in a state of the processor. In FIG. 13, if a value of $3 is not equal to a value of $6, five instructions from a head instruction next after the bne instruction to a tail instruction just before a label $L48 are not executed. In this way, the condition branch is realized by the cmt instruction.

As for a bcmt (branch commit) instruction, the input consists of a condition expression, an accepted task set if the condition expression is not satisfied, a rejected task set if the condition expression is satisfied, and a branch address if the condition expression is satisfied.

Figures 15, 16:
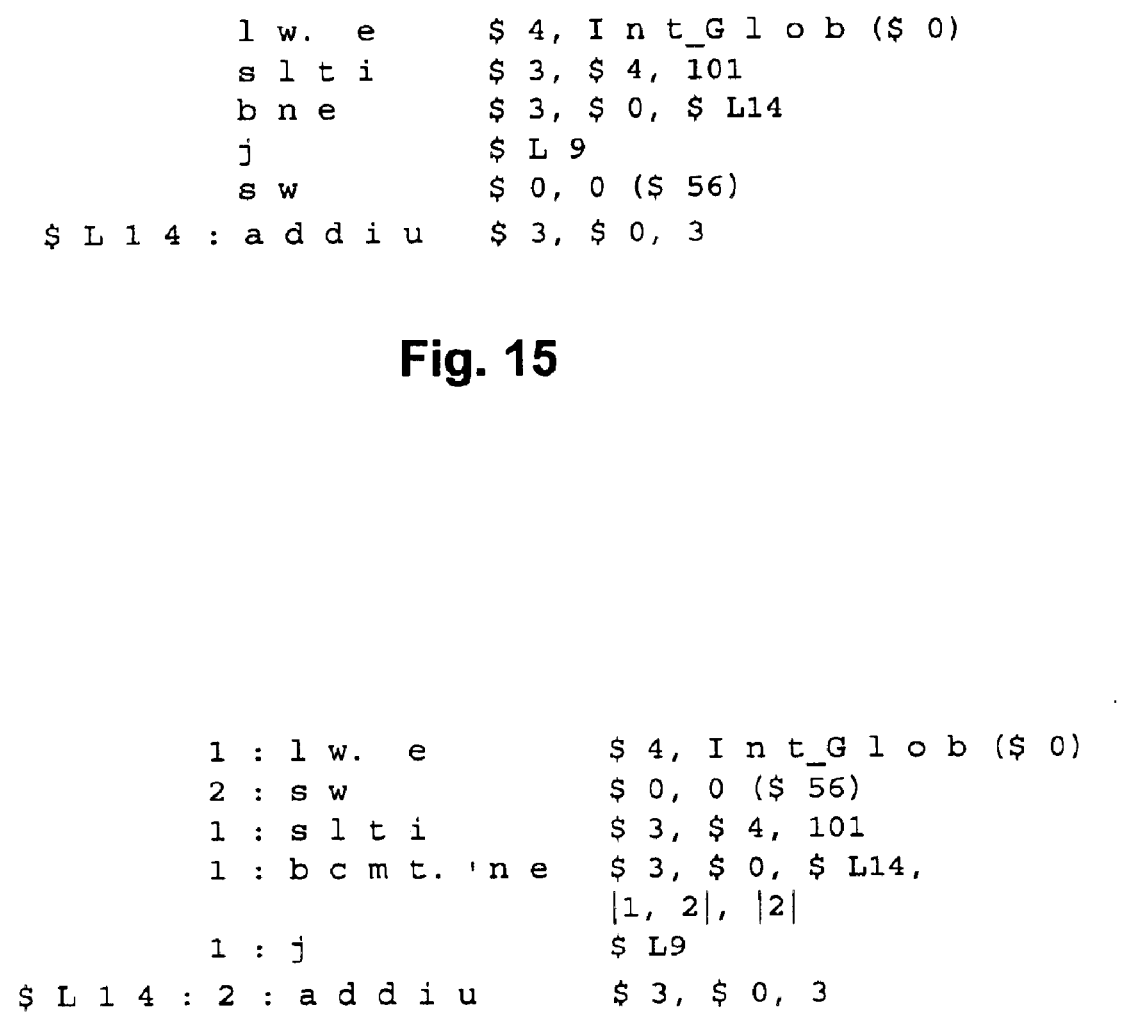

FIG. 15 shows an example of program code including the condition branch instruction according to the prior art. FIG. 16 shows an example in which the program code in FIG. 15 is represented by a bcmt instruction instead of a bne instruction according to the present invention. In the present invention, assume that a branch is not caused by the condition branch instruction in a prior program code. In this case, if all executable instructions are located before a commit instruction of the condition branch instruction, the condition branch is represented by a cmt instruction. On the other hand, assume that one part of the total executable instructions is not located before the commit instruction. In this case, if the condition is satisfied, the branch is executed by the bcmt instruction so that the one part instruction is not executed. Examples to use bcmt instruction are given as two cases: 1. an instruction can not be moved forward by passing over the commit instruction by the limit of dependency, and 2. a more effective operation is executed if the instruction is not moved forward by passing over the commit instruction. In FIG. 16, for example, a j instruction (direct jump instruction) can not be moved forward by passing over the commit instruction. But if an update of the program counter by the j instruction is executed after acceptance and the program counter is incremented by "1" until acceptance, the j instruction can be moved forward of the commit instruction.

As for the lcmt (loop commit) instruction, the input consists of a condition expression, a task number set consisting of a loop, an acceptable task number set for only the first loop, and a branch address if the condition expression is satisfied. The lcmt instruction is used to represent a control dependency in a loop structure.

Figures 17, 18, 19:
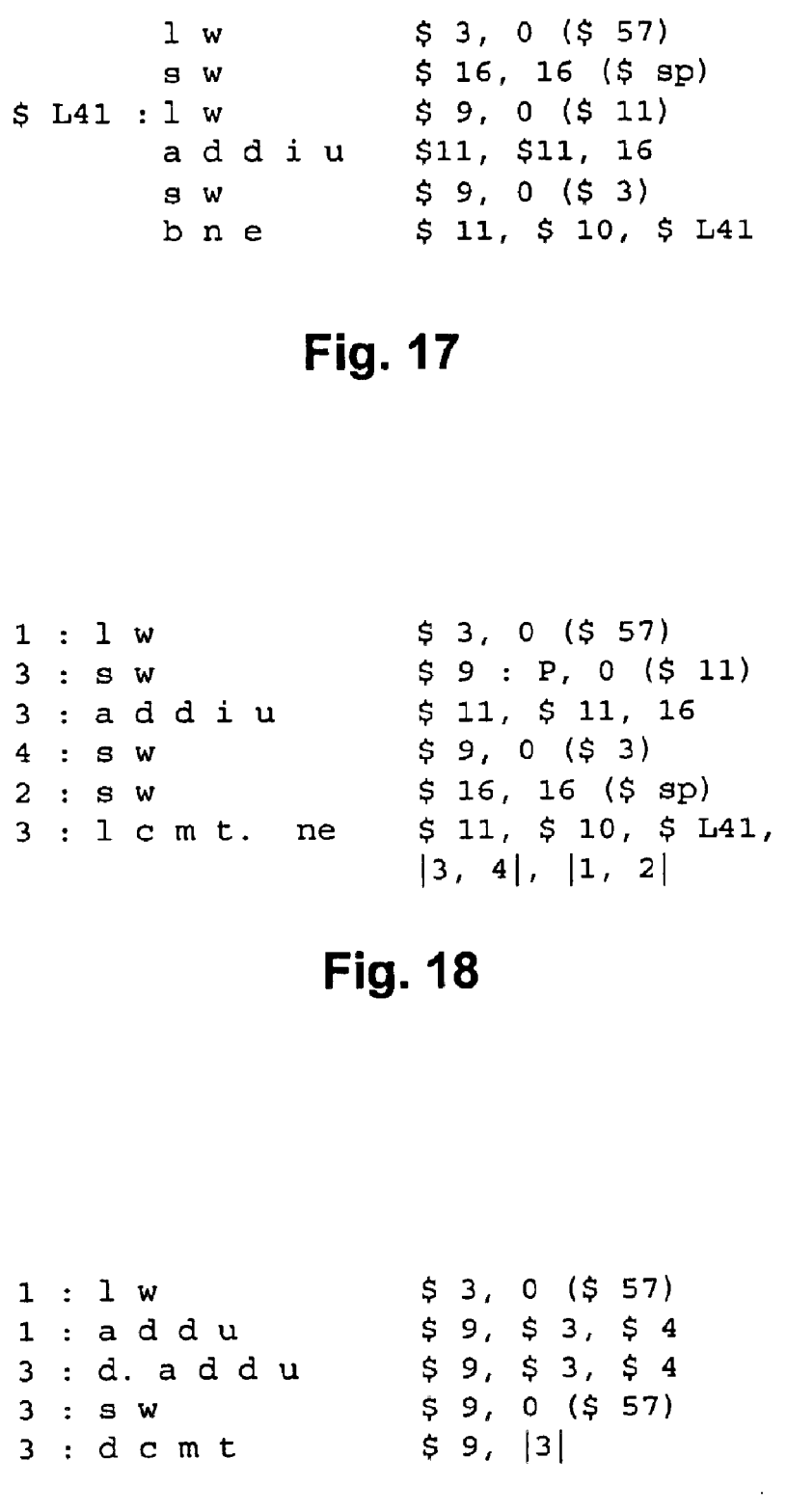

FIG. 17 shows an example of a program code including a condition branch instruction according to the prior art. FIG. 18 shows an example in which the program code in FIG. 17 is represented by an lcmt instruction instead of a bne instruction according to the present invention. First, when the lcmt instruction is executed, tasks consisting of the loop (In FIG. 18, tasks 3 and 4) and tasks accepted at first loop only (In FIG. 18, tasks 1 and 2) are accepted. If the condition expression in lcmt instruction is satisfied, the operation branches to a branch address (head of the loop) indicated by the lcmt instruction. In this case, task numbers of the tasks consisting of the loop are renamed to unused task numbers as much as possible. If the task number is changed, in the embodiment that the compiler assigns the task to the queue (the task number still corresponds to the queue), the queue to insert the task is different from the queue to insert the task during the one time previous loop. In case of executing the lcmt instruction after the second time, tasks consisting of a loop are accepted using the renamed information of the task number. For example, in FIG. 18, if the task numbers 3 and 4 are respectively renamed 5 and 6, the tasks 5 and 6 are accepted. The tasks to be accepted at only the first time loop are rejected. The renamed information of the task number is updated whenever the loop is executed. When the condition expression of the lcmt instruction is not satisfied, the renamed information is abandoned.

In a general super scalar processor, in order to exploit higher parallelism in case of repeatedly executing the loop, a register renaming function to dynamically change the register for the instruction to output is prepared. In the present invention, a set of local registers used by the instruction are divided according to the task window of the instruction. Accordingly, the parallel degree of instruction in case of executing the loop can be rised without the register renaming function.

Next, in the present invention, a method for representing data dependency is explained. Assume that one instruction (it is called an instruction B) relates to another instruction (it is called an instruction A) as a data dependency. If the instruction A is located before the instruction B in the program, a production flag is added to an output operand of the instruction A (In FIG. 18, the flag "P" is added to the output operand.). If the instruction B is located before the instruction A, a consumption flag is added to an input operand corresponding to the execution result of the instruction A in input operands of the instruction B. In the present invention, before the execution result of the instruction A to be used by the instruction B is obtained, a function to execute the instruction B by predicting the operation result of the instruction A can be considered (it is called "value prediction".). As a system to predicate the execution result of the instruction A, for example, last outcome-based value predictor is used ("Highly Accurate Data Value Prediction using Hybrid Predictors", IEEE Micro '97).

In the present invention, as a commit instruction to execute a value prediction, a dcmt instruction is prepared. As for the dcmt instruction, the input consists of a register number as output operand and a task number of instruction including the output operand.

FIG. 19 shows an example of a program code generated by the compiler in order to execute the value prediction. The compiler executes a task assignment so that an instruction to execute the value prediction is located at a head position of the task and clearly points out that this task is a particular task to execute the value prediction in the program code (In FIG. 19, "d." is added in front of instruction mnemonic "addu" of the task 3.). Furthermore, the instruction schedule is executed so that a dcmt instruction whose input consists of the output operand and the task number of the particular instruction is executed before this task is accepted.

In order to decide whether the prediction value is correct, an instruction the same as the particular instruction is assigned to a task not to execute the value prediction. The operand condition decision unit does not decide whether the input operand is usable for a head instruction of the task to execute the value prediction, transfers the head instruction to an output result prediction unit, and outputs a predicted value obtained from the output result prediction unit as the execution result to the local register. When the dcmt instruction is executed, it is decided whether a value of the input register is equal to the predicted value. If equal, the input task is accepted. If non-equal, the task to execute the value prediction is reexecuted as a task not to execute the value prediction. In this case, the dcmt instruction is not executed.

Furthermore, in the present invention, a dependency relation between subroutines is represented by a jcmt instruction and a rcmt instruction. As for the jcmt instruction, the input consists of an address of a subroutine to be called, and a task number set. The jcmt instruction outputs the address to begin the execution after returning from the subroutine as a result. In this case, tasks of the task number set are accepted and move the control to the indicated subroutine. As for the rcmt instruction, the input consists of a register number and a task number set. In case of executing the rcmt instruction, tasks of the task number set are accepted and the control is moved to an address of the register indicated by the register number.

Next, hereinafter, in the processor of the present invention, an operation of each unit in case of executing the instruction, and the components or functions of some units, are explained in detail. In the following explanation, the processing executed at each pipeline stage is defined as follows.

Fetch stage (F stage) . . . An instruction is fetched from the memory.

Decode stage (D stage) . . . The fetched instruction is decoded and inserted into the queue.

Execution stage (E stage) . . . An operation using the instruction execution unit is executed.

Memory stage (M stage) . . . Reading data from the cache memory and registration to the store buffer are executed.

Write back stage (W stage) . . . The operation result is written in the local register.

Furthermore, "instruction i" represents an instruction of instruction number i.

Figure 20:
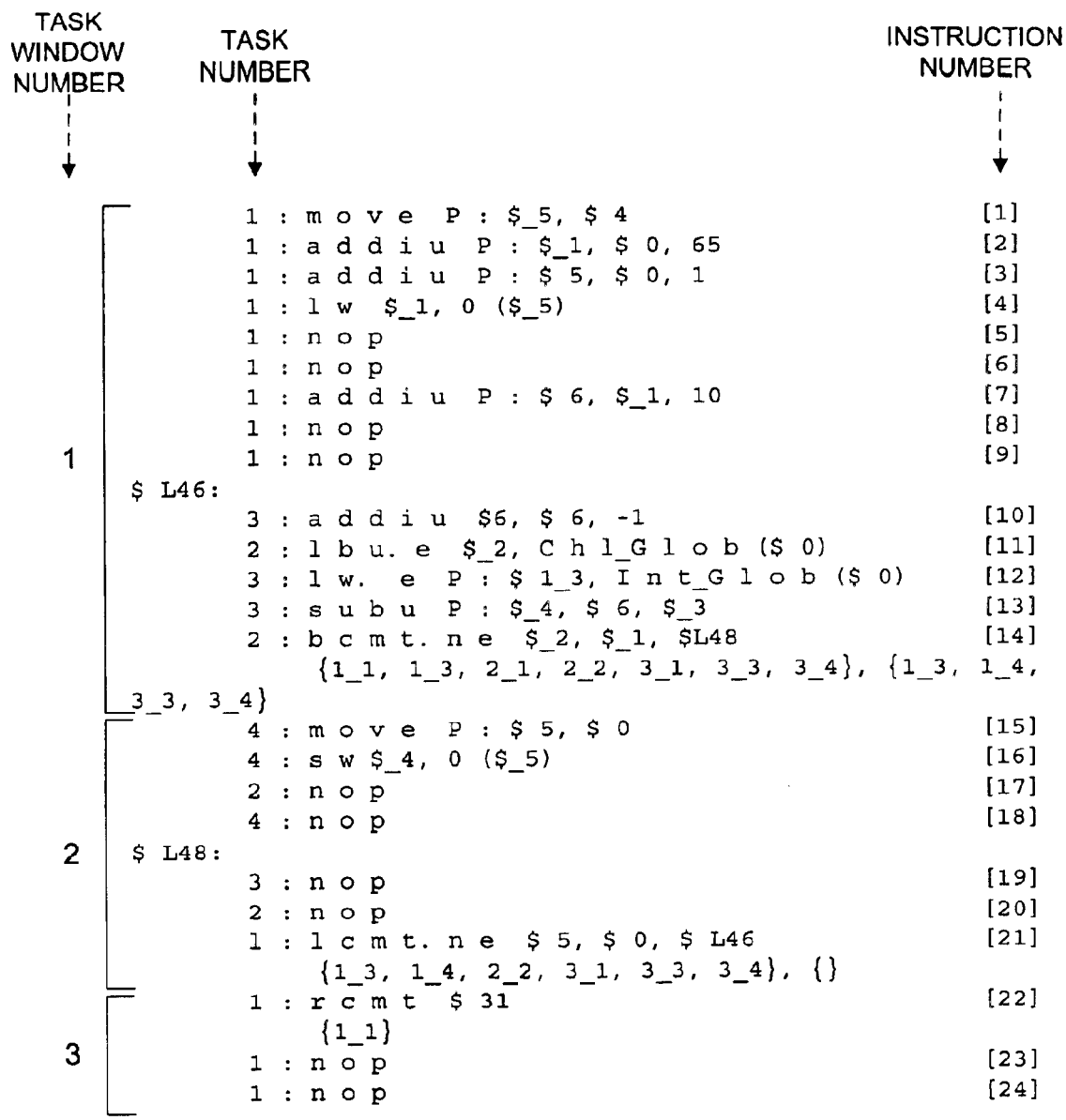
FIG. 20 is an example of a program in which a task number and a task window number are assigned.

FIG. 20 shows one example of a program to be executed by the processor. Hereinafter, a case that the program in FIG. 20 is used as an execution object is explained along with a cycle flow. In order to simply explain, assume that instructions executed by a pipeline do not exist at the start timing of the program in FIG. 20.

First, at F stage in cycle 1, the instruction fetch unit 3 fetches instructions 1~3 in order and inserts these instructions into the instruction queue 4. In the present invention, the number of simultaneous fetch operations does not depend on the number of processors. In this example, the number of simultaneous fetch operations is three.

Next, at F stage in cycle 2, the instruction fetch unit 3 fetches instructions 4~6 and inserts them into the instruction queue 4. On the other hand, at D stage in cycle 2, the instruction decoder 5 decodes the instructions 1~3 in the instruction queue 4, and obtains a class of instruction, operand data, a task number, and a production/consumption flag. Each instruction obtains a task window number from the task window number generator 6. The assignment unit 7 respectively inserts the instructions 1~3 into a corresponding queue in the execution buffer 8~10 according to the task number. Furthermore, the assignment unit 7 sets a global register number $5, a local register number $5 of the instruction execution unit 12, and a local register number $1 of the instruction execution unit 13 as non-use according to the production flag and the operand of each instruction.

Next, in cycle 3, the operand condition decision unit 11 decides whether a head instruction in each execution buffer is executable. The instructions 1~3 are executable. Accordingly, these instructions are respectively transferred to the instruction execution units 12~14 and executed. In this case, output of the instructions 1 and 2 respectively represents the local register. After executing the instructions 1 and 2, these local registers are set to be usable. On the other hand, at D stage of cycle 3, the instruction decoder 5 decodes the instructions 4~6 and inserts them into the corresponding queue in the execution buffer. The production/consumption flag is not added to the operand of the instructions 4~6. Accordingly, processing to set a specified register as non-use is not executed. At the F stage, the instruction fetch unit 3 fetches the instructions 7~9. In the following cycles, the same processing is executed at the F stage and the D stage.

At E stage in cycle 4, the instruction 4 is executed, and a load address is calculated by the instruction execution unit 12. A value of the local register $5 to be used by the instruction 4 is obtained by by-pass of the execution result of the instruction 1.

At W stage in cycle 5, the execution results of the instructions 1 and 2 are output to the local register. The execution result of the instruction 3 is also output to the local register to save this result and formally output it to the global register 18. On the other hand, at M stage in cycle 5, the data cache is referenced using the load address of the instruction 4. In case of cache-miss, the instruction 4 is registered in the load buffer 20. The instruction 7 is not executed in cycle 5 because the local register $1 is unusable.

In cycle 6, the load buffer 20 begins refill processing of the data cache for the load address of the instruction 4. In this case, an entry to be replaced in the data cache is set invalid. On the other hand, at E stage in cycle 6, the instructions 11 and 12 are executed, and the load address is calculated. The instruction 10 is not used because the global register $6 is unusable. At F stage in cycle 6, the instructions 16~18 are fetched. In a situation that a commit instruction 14 is not executed yet, the next commit instruction 21 is newly fetched. Accordingly, the instruction fetch unit 3 stops fetching instructions until the instruction 14 is erased in the execution queue.

At M stage in cycle 7, the data cache is referenced using the load address of the instructions 11 and 12. In case of a cache-hit for the instruction 12, a value is read from the data cache. On the other hand, in case that a cache-miss is caused for the instruction 11 and that a load address of the instruction 11 and a load address of the instruction 4 are different in the same cache line, the instruction 11 is merged into an entry of the instruction 4 in the load buffer. At E stage in cycle 7, the instruction 15 is executed while the instructions 13 and 14 are not executed.

At W stage in cycle 8, a value in the local register $3 of the instruction execution unit 12 is updated by the instruction 12. On the other hand, at D stage in cycle B, the instructions 19~21 are decoded. In a situation that the commit instruction 14 is not executed yet, the next commit instruction 21 is decoded. Accordingly, insertion of the instructions 19~21 into a corresponding queue in the execution buffer waits until the instruction 14 is executed, and decode of the following instructions is stopped.

At W stage in cycle 9, the execution result of the instruction 15 is written in the local register to save this result and formally output it to the global register. The same processing is executed at W stage in the following cycle.

In cycle 15, assume that refill processing is completed in the load buffer and the execution result of the instruction 4 is written in the local register. During cycles 10~15, the instruction fetch is only executed at F stage, and processing is not executed at other pipeline stages.

At E stage in cycle 16, the instruction 7 is executed. The loaded result of the instruction 11 in the load buffer is written into the local register.

At E stage in cycle 17, the instructions 10 and 14 are executed. The instruction 14 executes acceptance/rejection of a task according to the condition. If the condition is satisfied, tasks 1_1, 2_1, 2_2, and 3_1 are accepted and tasks 1_3, 1_4, 3_3, and 3_4 are rejected. The rejected tasks are erased from the execution buffer. As for the accepted tasks, if the instructions, that consist from a head instruction of the task to an instruction located just before the instruction to output to the global register, are completed (update in the local register is completed), the accepted tasks are erased from the execution buffer. In FIG. 20, the instructions 1, 2, 4, 11, and 14 are erased. On the other hand, the commit instruction 14 is already executed. Accordingly, the instruction decoder 5 begins to execute decode processing again, and the instructions 19~21 are respectively inserted into the execution buffers 8~10.

At W stage in cycle 18, the execution result of the instruction 7 is output to the global register 18. The instruction 7 is erased from the execution buffer. On the other hand, at E stage in cycle 18, the instruction 21 is executed. All tasks accepted by the instruction 21 except for tasks 2_2 and 3_1 are already erased. In this case, two tasks 2_2 and 3_1 are accepted, and the instruction 21 is erased from the execution buffer. The other processing is not executed because a loop condition is satisfied. Furthermore, at D stage in cycle 18, the instructions 10~12 are respectively inserted into the execution buffers 81~10. As mentioned-above, in case of executing the loop, renaming of the task number is executed in order to rise the parallelism. However, in this example, the instructions executed at previous loop time are not included in the execution buffer. Accordingly, renaming of task number is not executed.

In cycle 19, the instructions 10~12 are executed.

In cycle 20, the instructions 13~15 are executed. If a condition of the instruction 14 is not satisfied, tasks 1_3, 1_4, 2_2, 3_1, 3_3, and 3_4 are accepted.

At W stage in cycle 21, the global register $6 is updated by the instruction 10. At E stage, the instruction 16 is executed.

In cycle 22, the instruction 16 is registered in the store buffer 21. The instruction 16 is already accepted. Accordingly, the commit bit in an entry of the instruction 16 is set to "1". On the other hand, at W stage in cycle 22, the global register $5 is set to "0" by the instruction 15. At E stage, the instruction 21 is executed, and tasks 2_2 and 3_1 are accepted. In this case, if the loop condition is not satisfied, tasks not accepted/rejected are erased from the execution buffer 8~10 and the instruction queue 4. Then, the address generator 2 updately indicates the next instruction 22.

In cycle 23, the content of the memory is updated by the instruction 16 registered in the store buffer 21. On the other hand, at F stage, the instruction 22 is fetched.

In cycle 24, a commit instruction 22 is decoded.

In cycle 25, the commit instruction 22 is executed. The task 1_1 is accepted by the instruction 22. The address generator 2 updately indicates an address represented by the global register $31.

In FIG. 20, if the instruction 10 is located before the instruction 14 by the prior processor, a correction code to return any erroneous value in the register updated by the instruction 10 to an original value is necessary. Accordingly, if a speculative execution of the instruction 10 generates an error, a large penalty occurs. However, in the present invention, the instruction 10 can be located before the instruction 14 without generating the correction code. In short, the speculative moving of the instruction is executed without the correction code. Accordingly, out of order execution of the instruction in a wide area is realized by simple hardware. Furthermore, in the present invention, instructions located before a loop can be included in the loop (It is not executed in FIG. 20). By this moving, the speculative execution of the loop is possible in a wider area than in the prior art. In addition to this, in the present invention, in realization of VLIW format, a density of instructions also rises.

Next, in the present invention, a code generation method of compiler to generate a program code executable by the processor is explained. In order to generate the program code executable by the processor, in addition to processing executed by a compiler of the prior art, the compiler of the present invention includes three processings: 1. task assignment and task scheduling for instruction, 2. representation of dependency relation using commit instruction, and 3. register assignment and addition of production/consumption flag based on communication between registers. Hereinafter, these processings are explained.

Figure 21:
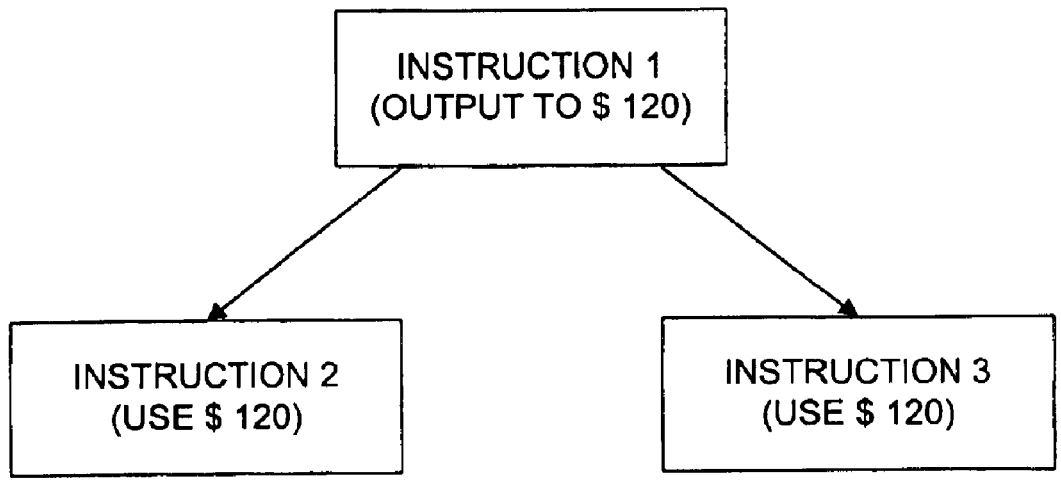
FIG. 21 is a schematic diagram of a divergence of data dependence sequences.
Figure 22:
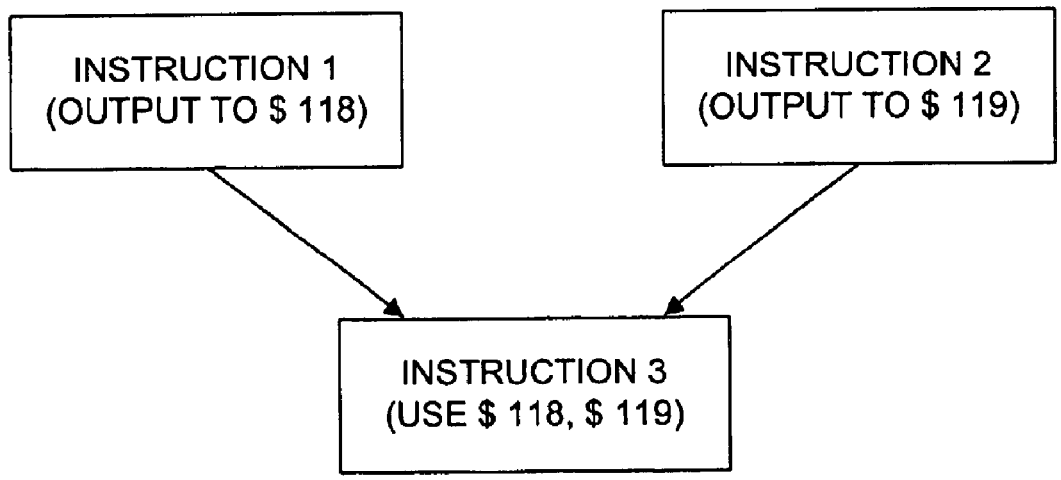
FIG. 22 is a schematic diagram of a confluence of the data dependence sequences.

First, task assignment and task scheduling for the instruction are explained. The maximum number of tasks allowed in one task window is the number of queues in the execution buffer in the processor. In the task assignment for the instruction, any data dependence relations between instructions are determined in a program and the program is divided into a plurality of data dependence sequences. Analysis of data dependence relation is executed in the same way as the compile method of the prior art. As for division of the data dependence relation, as shown in FIG. 21, if a branch exists in the data dependence relation, one branch destination instruction (In FIG. 21, instruction 2) is assigned to the data dependence sequence of branch source instruction (In FIG. 21, instruction 1), and the other instruction (In FIG. 21, instruction 3) is assigned to another data dependence sequence. Furthermore, as shown in FIG. 22, if a joint exists in the data dependence relation, a joint destination instruction (In FIG. 22, instruction 3) is assigned to the data dependence relation of one joint source instruction (In FIG. 22, instruction 1).

Next, the data dependence sequences to be speculatively executed are selected from all data dependence sequences, and the selected data dependence sequence is speculatively moved forward in the program. As for speculative moving of the data dependent sequence, the following conditions are necessarily satisfied.

1. A length of data dependence sequence to be speculatively moved is below the size of the queue.

2. In arbitrary state of the processor, a maximum number of the data dependence sequences speculatively executing (not accepted/rejected by the commit instruction) is below a predetermined number (arbitrary number smaller than number of the queue).

3. Order relation between the condition branch instructions does not change.

4. If a result used by instruction A included in data dependence sequence to be speculatively moved is different by the condition, a result to be used by the instruction A is determined at execution timing of the instruction A (All instructions depending on the instruction A are accepted/rejected.).

In order to satisfy the above condition 1, if a length of the data dependence sequences to be speculatively moved is above the size of the queue, the data dependence sequence is divided into a plurality of data dependence sequences each of which has a length below the size of the queue.

As for an instruction not included in the loop, the number of classes of control paths linked from a head of a subroutine to this instruction is limited. Accordingly, as for a state that this instruction is executed, this instruction is moved so that the above condition 2 is guaranteed by the control path whose number of speculative data dependence sequences is maximum. Furthermore, by a limit that instruction is not speculatively moved into a basic block consisting of the loop, the above condition 2 is guaranteed in a state that any instructions in the loop are executed.

In case that a data dependence sequence including a condition branch instruction is moved by passing over another condition branch instruction in the program, the data dependence sequence is divided into a part including the condition branch instruction and a part not including the condition branch instruction. By moving the part not including the condition branch instruction, the above condition 3 is guaranteed. In the same way, if the data dependence sequence is moved to a position that the above condition 4 is not satisfied, a part satisfying the condition 4 in the data dependence sequence is only moved.

Last, the data dependence sequence in each basic block is assigned to task. Speculative data dependence sequences are respectively assigned to different tasks, and non-speculative data dependence sequences are assigned to the remaining tasks. If the number of instructions included in a task is above the size of the queue (The one task is limited to a task assigned to non-speculative data dependence task), an unconditional commit instruction to unconditionally accept tasks is inserted into the instruction sequence of the task so that the unconditional commit instruction is executed until capacity of the queue is full.

The above explains the task assignment and the task scheduling for instructions by the compiler according to the present invention. In an embodiment that a non-speculative task is executed before a speculative task, a task number of the speculative task is previously determined in order to decide whether the task is speculative, and the computer assigns this task number to speculative data dependence sequence.

Next, a method for representing a dependence relation using a commit instruction is explained. A commit instruction of the present invention relates to an instruction prepared in the processor of the prior art as following correspondence relation. The compiler converts the instruction of the prior art to the commit instruction according to the correspondence relation in order to represent the dependence relation. A general condition branch instruction corresponds to the bcmt instruction. A basic block to which the bcmt instruction branches is the same as a basic block to which the condition branch instruction branches before conversion. In this case, a part of the instructions in the basic block of a branch destination is often speculatively moved forward in the program. As tasks to be accepted by bcmt instruction, non-speculative tasks which are not accepted at execution timing of the bcmt instruction are indicated. As tasks to be rejected by bcmt instruction, in speculative tasks which are not rejected at execution timing of the bcmt instruction, tasks assigned to instructions in an unarrivable control path in case that a condition of the bcmt instruction is satisfied are indicated.

At a completion timing of task scheduling, if all instructions to be executed only in case that the branch condition is not satisfied are located before the condition branch instruction, the condition branch instruction corresponds to the cmt instruction. Indication of tasks to be accepted/rejected by the cmt instruction is the same as the bcmt instruction.

A condition branch instruction used for repeating a loop corresponds to the lcmt instruction. A branch destination of the lcmt instruction is the same as a branch destination of the condition branch instruction before conversion. In non-speculative tasks which are not accepted at the first execution timing of the lcmt instruction, tasks not consisting of the loop are indicated as tasks to be accepted at the first loop execution only and the remaining tasks are indicated as tasks consisting of the loop.

A subroutine call instruction corresponds to the jcmt instruction and a subroutine return instruction corresponds to the rcmt instruction. The tasks to be accepted by the jcmt/rcmt instruction are indicated in the same way as the bcmt instruction.

A check instruction ("Memory Conflict Buffer for Achieving Memory Disambiguation in Compile-Time Code Schedule", U.S. Pat. No. 5,694,577) in a processor of the prior art corresponds to the ccmt instruction.

A dcmt instruction is inserted as a last instruction in a task including the instruction to execute value prediction. An output register of the prediction instruction and the task are indicated as the input operand.

Next, register assignment and addition of production/consumption flag based on communication between tasks are explained. After the task scheduling and generation of the commit instruction, instruction scheduling is executed a task window at a time. In the instruction scheduling, the order relationship of instructions in the same task is not changed. However, the order relationship between different tasks is freely changed. If a data dependence relationship exists in instructions belonging to different tasks, a production/consumption flag is added to the instruction according to the location order. If an instruction to produce data is located before, the production flag is added to an output operand of the instruction. On the other hand, if an instruction to consume data is located before, the consumption flag is added to an input operand of the instruction.

Next, a register assignment is executed to scheduled instructions. In the present invention, the global register is used in three cases: 1. A plurality of tasks, each of which generates a value used by some instruction as input, exists; 2. The execution result of instruction belonging to some task is written in a plurality of local registers; and 3. A register is used as an interface between a subroutine and the main routine. As for the assignment of the global register, a compiler method of the prior art is applied. The compiler assigns the local register except for the above-mentioned case. The assignment of the local register is executed one task at a time to read each local register. Basically, a compiler method of the prior art is applied. However, if the local register is updated by a task instruction as a non-object of the local register assignment, the register assignment is executed for an input operand instruction to input from the local register.

Furthermore, as for an occupied space in the local register, the beginning is a head part of a task window including an instruction to update the local register and the end is an end part of the next task window location including an instruction to use the local register. As one example of a register representation in the present invention, different register numbers are assigned to the local register and the global register. As for different local register sets, overlapping register numbers are used. As for an instruction to output the execution result to the local register, a number of the local register set to be updated is added.

Hereinafter, as for the program code described by sign register shown in FIG. 23, an operation to generate a code according to the present invention is explained. In this example, the assignment of each task to the queue in the execution buffer is executed by the compiler. The program code in FIG. 23 is represented by the VLIW method, in which the execution unit to be used by an instruction is determined by location address of the instruction. In the example of FIG. 23, the number of instruction execution units is three, the number of queues is four for each execution buffer (total is twelve), and a size of each queue is eight.

First, the compiler of the present invention divides the program code into a plurality of data dependence sequences. The program code in FIG. 23 is divided into eleven data dependence sequences as shown in FIG. 24. In this case, each data dependence sequence consists of instructions not executable in parallel. Next, a data dependence sequence to be speculatively executed is selected and moved. The program code is scheduled so that a length of all codes is minimalized. In this example, data dependence sequences 4, 5, 7, 8, and 10 are selected. As a result, the program code shown in FIG. 25 is obtained. Last, a task number is assigned to each data dependence sequence as shown in FIG. 26.

In FIG. 26, the instruction unit used by an instruction is determined by location address of the instruction. In FIG. 26, each line consists of three instructions to be simultaneously executed in one cycle. As for the three instructions, a first instruction is executed by the instruction execution unit 12; a second instruction is executed by the instruction execution unit 13; and a third instruction is executed by the instruction execution unit 14 in FIG. 3. In FIG. 26, numbers 1~4 added to a head of instruction mnemonic discriminates the task to be inserted into the corresponding queue in the execution buffer. As a result, twelve tasks are represented because three instruction execution units each process four tasks. In other words, twelve tasks are included in each task window. As mentioned-above, each instruction execution unit processes four queues respectively corresponding to tasks 1~4. Accordingly, each instruction is inserted into one queue of the four queues corresponding to one execution buffer according to the task number and the address of each instruction.

The above explanation is the example of task assignment and task scheduling. Next, in order to represent a dependence relation between instructions, a specified instruction is converted into the commit instruction. In FIG. 26, a condition branch instruction (beq, bne) and a register indirect jump instruction (jr) to return from a subroutine are converted into the commit instruction. In FIG. 26, all instructions, that are executed in case that a branch condition of first "bne" instruction is not satisfied, are located before the first instruction. Accordingly, the first bne instruction is converted into a cmt instruction. The second "bne" instruction and the "beq" instruction are converted into a bcmt instruction, and the "jr" instruction is converted into a rcmt instruction.

FIG. 27 shows the program code having the commit instruction instead of the above-mentioned branch instruction and jump instruction in FIG. 26. As for tasks to be accepted/rejected by the commit instruction, an instruction execution unit number (an execution buffer number) to which the queue belongs and a task number corresponding to the queue are represented as a combination (For example, in FIG. 27, the combination number "2_1" added to the instruction mnemonic). Next, by assigning a register and adding a production/consumption flag to the program code in FIG. 27, the program code operatable by the processor is obtained. In FIG. 27, two instructions to update sign register $112 and one instruction to update sign register $113 are included. Accordingly, the global register is assigned to these sign registers. As for a register used as an interface between a subroutine and the main routine, the global register is assigned. As for other register, the local register is assigned. Last, if a data dependence relationship exists in the instructions belonging to different queues, the production flag (P:) or the consumption flag (C:) are added to the instruction to use the register for data delivery.

FIG. 28 shows a final program code obtained by the above-mentioned processing. In FIG. 28, a register including "_" represents the local register, and another sign register represents the global register. Furthermore, an instruction, that outputs to the local register including a number in front of "_", updates the indicated local register in the local register set represented by this number.

As mentioned-above, in the present invention, dependency between instructions is represented by the commit instruction and the production/consumption flag of a register. Accordingly, instructions are out of order in a wider area by a smaller hardware scale than in the processor of the prior art. Furthermore, the compiler clearly indicates whether the instruction is speculative, and non-speculative instructions are executed before speculative instructions. As a result, fall of ability because an unnecessary instruction monopolizes the execution unit is avoided, and the ability of the processor greatly rises.

A memory can be used to store instructions for performing the process described above. The process may be performed with the aid of a general purpose computer or microprocessor. Such a memory can thus be a CD-ROM, floppy disk, hard disk, magnetic tape, semiconductor-memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A central processing apparatus for assigning instructions of a program to a plurality of buffers each connected to one of a plurality of execution units, the plurality of execution units each executing the instructions by accessing a memory and a global register, wherein the program comprises a plurality of instruction sequences, each instruction sequence comprises a plurality of instructions not executable in parallel because of data dependency, wherein an instruction sequence speculatively executable is located before an instruction sequence not speculatively executable, the plurality of instruction sequences are aligned in correspondence with each of the plurality of buffers, a task number representing the instruction sequence and a corresponding buffer is assigned to each instruction, a condition instruction is replaced by a commit instruction, the commit instruction includes a condition, task numbers to be accepted if the condition is not satisfied and task numbers to be rejected if the condition is satisfied, the central processing apparatus, comprising:

a task window number generator configured to assign a task window number to a plurality of instruction sequences in a task window, the commit instruction being at the end of the task window;

an assignment unit configured to assign each instruction of aligned instruction sequences to each of the plurality of buffers by referring to the task number;

a register update unit configured to update data in a register number accessed by a particular instruction sequence in a task window if the particular instruction sequence is accepted by the commit instruction in the task window; and a memory update unit configured to update data in a memory address accessed by a particular instruction sequence in a task window if the particular instruction sequence is accepted by the commit instruction in the task window.

2. The central processing apparatus according to claim 1, wherein the instruction sequence of data production or data consumption includes a flag representing possession of the register number in the global register.

3. The central processing apparatus according to claim 2, wherein the plurality of instruction sequences is aligned so that the number of aligned instructions is equal to the number of the plurality of execution units.

4. The central processing apparatus according to claim 3, wherein the instruction sequence speculatively executable is the instruction sequence to be executed if the condition is not satisfied and the instruction sequence to be executed if the condition is satisfied, and wherein the instruction sequence not speculatively executable is the instruction sequence including the commit instruction.

5. The central processing apparatus according to claim 4, wherein the commit instruction represents a branch condition instruction, and additionally includes a branch address of the instruction if the condition is satisfied.

6. The central processing apparatus according to claim 3, wherein the commit instruction in the task window represents a loop condition instruction, and includes a loop condition, the task numbers representing a loop, and the task numbers to be accepted in case of the first loop only.

7. The central processing apparatus according to claim 3, wherein the global register comprises a plurality of register numbers, and the flag of the instruction of data production or data consumption represents the register number of non-use for other instructions until the instruction is completely executed.

8. The central processing apparatus according to claim 7, further comprising an instruction decoder configured to decode a plurality of the instructions in order, and supply each instruction to said assignment unit along with operand data, the task number, and the task window number to which the instruction belongs.

9. The central processing apparatus according to claim 8, wherein, when said instruction decoder decodes the instruction including the flag, said instruction decoder sets the register number in the global register represented by the flag as non-use for the other instructions.

10. The central processing apparatus according to claim 3, wherein each of the plurality of buffers comprises a plurality of queues, and each of the plurality of queues exclusively stores the instructions of predetermined task number by first in first out.

11. The central processing apparatus according to claim 10, wherein said assignment unit assigns each instruction of the aligned instruction sequences to the queue in the execution buffer corresponding to the task number of each instruction and further comprising an operand condition decision unit which repeatedly selects one instruction from each instruction at a head position of each queue in the execution buffer by priority order, and indicates the execution buffer to transfer the one instruction to the execution unit connected to the execution buffer.

12. The central processing apparatus according to claim 1, wherein said task window number generator increments the task window number by one when the commit instruction is detected as the last instruction in the instruction sequence, and assigns an incremented task window number to the instruction sequences consisting of the instruction sequences from an instruction just behind the commit instruction to the next commit instruction in the program.

13. The central processing apparatus according to claim 9, further comprising a plurality of local registers respectively connected to each of the plurality of execution units, wherein each execution unit executes the instruction by accessing a respective local register in order to temporarily preserve the execution result of the instruction.

14. The central processing apparatus according to claim 13, wherein, if a particular instruction sequence is accepted by execution of the commit instruction in the task window, said register update unit updates data in the register number of the global register represented by the flag in the particular instruction sequence using the execution result preserved in the local register.

15. The central processing apparatus according to claim 13, wherein, if a particular instruction sequence is rejected by execution of the commit instruction in the task window, said register update unit does not update data in the register number of the global register represented by the flag in the particular instruction sequence.

16. The central processing apparatus according to claim 1, wherein said memory update unit temporarily preserves the execution result of a store instruction in a particular instruction sequence executed by the execution unit.

17. The central processing apparatus according to claim 16, wherein, if the particular instruction sequence is accepted by execution of the commit instruction in the task window, said memory update unit updates data in the address of the memory represented by the store instruction using the preserved execution result.

18. The central processing apparatus according to claim 16, wherein, if the particular instruction sequence is rejected by execution of the commit instruction in the task window, said memory update unit does not update data in the address of the memory represented by the store instruction.

19. The central processing apparatus according to claim 16, further comprising a load buffer to temporarily preserve a load instruction in order to read data from the memory or said memory update unit.

20. The central processing apparatus according to claim 19, wherein, when the execution unit executes the load instruction in a particular instruction sequence accepted by the commit instruction, the execution unit decides whether the load instruction depends on the execution result of the store instruction in said memory update unit.

21. The central processing apparatus according to claim 20, wherein, if the load instruction depends on the execution result of the store instruction in said memory update unit, the load buffer loads the execution result of the store instruction from said memory update unit.

22. The central processing apparatus according to claim 21, wherein, if the load instruction does not depend on the execution result of the store instruction in said memory update unit, the load buffer loads data stored in the address of the memory represented by the load instruction.

23. A method for generating a program executed by a central processing apparatus for assigning instructions of the program to a plurality of buffers each connected to one of a plurality of execution units, the plurality of execution units executing the instruction by accessing a memory and a global register, comprising:

dividing the program into a plurality of instruction sequences, each instruction sequence comprising a plurality of instructions not executable in parallel because of data dependency;

moving an instruction sequence speculatively executable forward of an instruction sequence not speculatively executable in the program;

aligning the plurality of instruction sequences in correspondence with each of the plurality of buffers;

assigning a task number representing the instruction sequence and a corresponding buffer to each instruction; and replacing a condition instruction by a commit instruction, the commit instruction including a condition, task numbers to be accepted if the condition is not satisfied and task numbers to be rejected if the condition is satisfied.

24. A computer readable memory containing computer readable instructions in a computer for assigning instructions of a program to a plurality of buffers each connected to one of a plurality of execution units, the plurality of execution units executing the instructions by accessing a memory and a global register, comprising:

an instruction unit to divide the program into a plurality of instruction sequences, each instruction sequence comprising a plurality of instructions not executable in parallel because of data dependency;

an instruction unit to move an instruction sequence speculatively executable forward of an instruction sequence not speculatively executable in the program;

an instruction unit to align the plurality of instruction sequences in correspondence with each of the plurality of buffers;

an instruction unit to assign a task number representing the instruction sequence and a corresponding buffer to each instruction; and an instruction unit to replace a condition instruction by a commit instruction, the commit instruction including a condition, task numbers to be accepted if the condition is not satisfied and task numbers to be rejected if the condition is satisfied.

* * * * *